US006772361B1

(12) United States Patent
Walsh

(10) Patent No.: US 6,772,361 B1
(45) Date of Patent: Aug. 3, 2004

(54) REAL TIME CLOCK (RTC) HAVING SEVERAL HIGHLY DESIRABLE TIMEKEEPING DEPENDABILITY AND SECURITY ATTRIBUTES, AND METHODS FOR ACCESSING A REGISTER THEREOF

(75) Inventor: James J. Walsh, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 707 days.

(21) Appl. No.: 09/613,008

(22) Filed: Jul. 10, 2000

(51) Int. Cl.[7] ............................. G06F 1/04; G06F 1/14
(52) U.S. Cl. ....................................................... 713/502
(58) Field of Search ............................... 713/1, 2, 500, 713/502, 503, 400, 501, 600

(56) References Cited

U.S. PATENT DOCUMENTS

| | | | | |
|---|---|---|---|---|
| 3,999,050 A | | 12/1976 | Pitroda | |
| 5,327,404 A | * | 7/1994 | Nolan | 368/201 |
| 5,333,295 A | | 7/1994 | Podkowa | |
| 5,533,123 A | * | 7/1996 | Force et al. | 713/189 |
| 5,768,573 A | * | 6/1998 | Dixon | 713/502 |
| 5,771,180 A | * | 6/1998 | Culbert | 702/130 |
| 5,829,008 A | * | 10/1998 | Podkowa et al. | 711/5 |
| 5,943,297 A | * | 8/1999 | Baker | 368/10 |
| 5,968,133 A | * | 10/1999 | Latham et al. | 709/248 |
| 6,545,950 B1 | * | 4/2003 | Walukas et al. | 368/47 |

OTHER PUBLICATIONS

RSA Laboratories®, "Frequently Asked Questions About Today's Cryptography," © 1996, 1998 RSA Data Security, Inc., pp. 1–216.

Ritter, "Ritter's Crypto Glossary and Dictionary of Technical Cryptography," Jan. 1999.

Mills, "Internet Time Synchronization: The Network Time Protocol," IEEE Transactions on Communications, vol. 39, No. 10, Oct. 1991, pp. 1482–1495.

Mills, "Network Time Protocol (Version 3), Specification, Implementation and Analysis," Network Working Group, Mar. 1992.

* cited by examiner

Primary Examiner—Dennis M. Butler
(74) Attorney, Agent, or Firm—Meyertons Hood Kivlin Kowert & Goetzel, P.C.; B. Noël Kivlin

(57) ABSTRACT

A real time clock (RTC) is described several timekeeping dependability and timekeeping security attributes. The RTC may have several registers for storing values, at least one of which stores a value which is safeguarded. For example, a "TrustQualityState" register stores a "TrustQualityState" value which is dependent upon a timekeeping accuracy of the RTC. The "TrustQualityState" value may also be dependent upon timekeeping stability, reliability, and/or security of the RTC (e.g., a tamper resistance of the RTC). The RTC includes an access unit coupled between the "TrustQualityState" register and a bus used to access the "TrustQualityState" register. The access unit controls access to the "TrustQualityState" register in order to safeguard the "TrustQualityState" value. The access unit receives read and write commands directed to "TrustQualityState" register via the bus. The access unit determines if a source of a received read or write command directed to the register is authorized to access the register, and provides access to the register only if the source is authorized to access the register. The "TrustQualityState" value may expire a predetermined period of time after issue. In this case, the access unit may also include a counter configured to issue a signal after the predetermined period of time. When the access unit receives the signal from the counter, the access unit may store a default value of "0" in the "TrustQualityState" register.

20 Claims, 13 Drawing Sheets

REAL TIME CLOCK (RTC) HAVING SEVERAL HIGHLY DESIRABLE TIMEKEEPING DEPENDABILITY AND SECURITY ATTRIBUTES, AND METHODS FOR ACCESSING A REGISTER THEREOF

CROSS-REFERENCE TO RELATED APPLICATION

This application relates to co-pending application Ser. No. 09/613,011, filed on the same day as the present application and entitled "MULTILEVEL NETWORK FOR DISTRIBUTING TRUSTED TIME AND DELEGATING LEVELS OF TRUST REGARDING TIMEKEEPING" by James J. Walsh, which is incorporated herein by reference in its entirety.

This application also relates to co-pending application Ser. No. 09/613,009, filed on the same day as the present application and entitled "METHODS FOR PROVIDING ESTIMATES OF THE CURRENT TIME IN A COMPUTER SYSTEM INCLUDING A TIME SOURCE HAVING ONE OF SEVERAL POSSIBLE LEVELS OF TRUST WITH REGARD TO TIMEKEEPING" by James J. Walsh, now U.S. Pat. No. 6,708,281, which is also incorporated herein by reference in its entirety.

BACKGROUND OF THE INVENTION

1. Field of the Invention

This invention relates to computer systems, and more particularly to computer systems including timekeeping systems.

2. Description of the Related Art

Due to their limitations, time keeping devices such as time clocks are only capable of providing estimates of the current time and/or date. Time critical functions, such as air traffic control operations and banking transaction time stamping functions, require highly accurate estimates of the current time and/or date. Other time dependent functions, such as software evaluation/rental/lease agreements or music rental agreements involving set periods of time, require less accurate estimates of the current time and/or date.

A typical personal computer (PC) includes two time keeping systems: a hardware real time clock (RTC), and a software virtual clock maintained by an operating system. The RTC typically includes a battery backup source of electrical power, and continuously maintains an estimate of the current date and time. The software virtual clock is typically synchronized to the RTC during PC power up and initialization (i.e., during operating system boot up). In many PCs, synchronization of the software virtual clock to the RTC occurs only during operating system boot up.

Unfortunately, the RTC of the typical PC is highly subject to tampering. For example, a PC user is typically free to change the current date/time maintained by the RTC of the PC at will. Further, a PC user may tamper with accessible hardware components of the RTC (e.g., an oscillator crystal) in order to make the RTC run slow, thereby potentially extending time periods of software evaluation/rental/lease agreements or music rental agreements relying on the RTC for timekeeping.

Many different time synchronization systems exist for synchronizing computer system time clocks over networks (e.g., the Internet). Examples of such network time synchronization systems include the network time protocol (NTP) and the related simple network time protocol (SNTP). Time synchronization software executed by a PC typically provides periodic time synchronization of an RTC of the PC to an external time source. The time synchronization software may also track RTC timekeeping errors and adjust programmable RTC timekeeping circuits to improve RTC timekeeping accuracy between periodic time synchronizations.

It is now possible to obtain (e.g., via the Internet) application software and other content (e.g., music) for use over a fixed period of time (e.g., on an evaluation basis, or subject to a rental or lease agreement). As techniques do not exist for verifying the accuracy and/or security of a PC timekeeping system, sophisticated software evaluation/rental/lease systems typically include with the application software either separate timekeeping software or monitoring software which detects/prevents changes to the current date/time maintained by the RTC of a PC. Like the RTC itself, timekeeping and monitoring software is vulnerable to tampering, and security issues related to software evaluation/rental/lease systems are believed to be major reasons why relatively expensive application software programs (e.g., large computer aided design programs) are generally not available for evaluation/rental/lease via the Internet.

A real time clock (RTC) of a computer system typically functions as a local source of estimates of the current time. In order to facilitate applications such as the distribution of software for evaluation/rental/lease via the Internet, it would thus be desirable to have an RTC having several highly desirable timekeeping accuracy and/or security (e.g., time clock tamper resistance) attributes. For example, more expensive application software for evaluation/rental/lease may require estimates of the current time from sources having higher levels of timekeeping accuracy and/or timekeeping security. In this case, having an RTC with a relatively high level of timekeeping accuracy and/or security may allow access to a larger set of application software for evaluation/rental/lease.

SUMMARY OF THE INVENTION

A real time clock (RTC) is described several highly desirable timekeeping dependability and timekeeping security attributes. The RTC may have several registers for storing values, at least one of which stores a value which is safeguarded. For example, a "TrustQualityState" register stores a "TrustQualityState" value which is dependent upon a timekeeping accuracy of the RTC. The "TrustQualityState" value may also be dependent upon a timekeeping stability of the RTC, a timekeeping reliability of the RTC, and/or a timekeeping security of the RTC (e.g., a tamper resistance of the RTC). The RTC includes an access unit coupled between the "TrustQualityState" register and a bus used to access the "TrustQualityState" register. The access unit controls access to the "TrustQualityState" register in order to safeguard the "TrustQualityState" value.

The access unit is adapted for coupling to the bus. In some embodiments, the RTC may be adapted for coupling to a peripheral component interconnect (PCI) bus. For example, the RTC may be part of "south" bridge logic coupled between a PCI bus and an industry standard architecture (ISA) bus. The south bridge logic may couple address, data, and/or control signals between the RTC and the PCI bus. In other embodiments, the RTC may be adapted for coupling to an ISA bus.

The access unit receives a value (e.g., the "TrustQualityState" value) to be stored in a register (e.g., the "TrustQualityState" register) as write data from a source via the bus. The access unit is configured to determine if the source is authorized to modify the value, and to store the value in the register only if the source is authorized to modify the value.

The register may include multiple volatile storage cells requiring electrical power to store the value. In this case, the RTC may include a battery, and the register may receive electrical power from: (i) a source external to the RTC (e.g., a computer power supply), and (ii) the battery when electrical power is not available from the external source. Alternately, the register may include multiple non-volatile storage cells which do not require electrical power to store the value.

The value stored in the register may expire a predetermined period of time after issue. In this case, the access unit may be configured to store a default value of "0" in the register when the predetermined period of time has elapsed. For example, the RTC may include a counter configurable to issue a signal after the predetermined period of time. When the access unit receives the value and stores the value in the resister, the access unit may configure the counter to issue the signal after the predetermined period of time. When the access unit receives the signal from the counter, the access unit may store the default value of "0" in the register.

The counter may require electrical power for operation. In this case, where the RTC includes a battery, the counter may receive electrical power from: (i) the source external to the RTC, and (ii) the battery when electrical power is not available from the external source.

The RTC may also include timekeeping logic coupled to receive a clock signal and configured to maintain an estimate of the current time dependent upon a frequency of the clock signal. The RTC may also include accuracy detection logic coupled to receive the clock signal and configured to issue an error signal if the frequency of the clock signal deviates from an acceptable frequency range.

A method for storing a value in a register, which may be embodied within a receiver coupled between the register and a bus used to access the register and controlling access to the register, includes the receiver receiving a read command directed to the register from a source. The read command may, for example, include the address of the register where the register is an addressable register. The receiver provides a challenge value to the source as read data in response to the first read command. The receiver uses the challenge value to calculate an expected response value. The receiver receives a first write command directed to the register and including a response value as write data. The receiver compares the response value to the expected response value. The receiver receives a second write command directed to the register and including the value to be stored in the register as write data. The receiver stores the value in the register only if the response value is equal to the expected response value. In addition, the second write command may need to be the first command received following the first write command in order for the receiver to store the value in the register.

A corresponding method for storing a value in a register, which may be embodied within the source, includes the source issuing the read command directed to the register, and receiving the challenge value as read data. The source uses the challenge value to calculate the response value. The source issues the first write command directed to the register and including the response value as write data. The source issues the second write command directed to the register and including the value to be stored in the register as write data.

The above methods for storing a value in a register may include multiple challenge-response exchanges. During each challenge-response exchange, the source issues a read command directed to the register. The receiver receives the read command and provides a challenge value as read data in response to the read command. Each challenge value is preferably different from all others. While the source receives the challenge value as read data and uses the challenge value to calculate the response value, the receiver uses the challenge value to calculate the expected response value. The source issues a write command directed to the register and including the response value as write data. The receiver receives the write command, and compares the response value to the expected response value. As multiple challenge-response exchanges are performed, each challenge-response exchange may include the receiver recording a challenge-response failure if the response value is not equal to the expected response value.

After the final challenge-response exchange, the source issues a final write command directed to the register and including the value as write data. The receiver receives the final write command, and stores the value in the register only if a challenge-response failure is not recorded in any of the challenge-response exchanges. In addition, the final write command may need to be the first command received following the write command of a final challenge-response exchange in order for the receiver to store the value in the register.

In an alternate method for storing a value in a register, which may be embodied within the receiver, the receiver receives a write command from the source. The write command is directed to the register and includes write data. A first portion of the write data is designated for conveying a password value, and wherein a second portion of the write data is designated for conveying the value to be stored in the register. The receiver compares the contents of the first portion of the write data to the password value, and stores the value in the register only if the contents of the first portion of the write data is equal to the password value. The write data may be encoded, and the method may include decoding the encoded write data.

A method for providing a value stored in a register, which may be embodied within a receiver coupled between the register and a bus used to access the register and controlling access to the register, includes the receiver receiving a first read command directed to the register from a source. The receiver provides a challenge value as read data in response to the first read command, and uses the challenge value to calculate an expected response value. The receiver receives a write command directed to the register and including a response value as write data. The receiver compares the response value to the expected response value. The receiver receives a second read command directed to the register. The receiver provides the value stored in the register as read data in response to the second read command only if the response value is equal to the expected response value. In addition, the second read command may need to be the first command received following the write command in order for the receiver to provide the value stored in the register.

A corresponding method for obtaining a value stored in a register, which may be embodied within the source, includes the source issuing the first read command, and receiving the challenge value as read data. The source uses the challenge value to calculate the response value. The source issues the write command directed to the register and including the response value as write data. The source issues the second read command directed to the register, and receives the value stored in the register as read data.

The above methods for providing and obtaining a value in a register may include multiple challenge-response exchanges. During each challenge-response exchange, the source issues a read command directed to the register. The receiver receives the read command, and provides a challenge value as read data in response to the read command. Each challenge value is preferably different from all others. While the source receives the challenge value as read data and uses the challenge value to calculate the response value, the receiver uses the challenge value to calculate the expected response value. The source issues a write command directed to the register and including the response value as write data. The receiver receives the write command, and compares the response value to the expected response value. As multiple challenge-response exchanges are performed, each challenge-response exchange may include the receiver recording a challenge-response failure if the response value is not equal to the expected response value.

After the final challenge-response exchange, the source issues a final read command directed to the register. The receiver receives the final read command, and provides the value stored in the register as read data only if a challenge-response failure is not recorded in any of the challenge-response exchanges. In addition, the final read command may need to be the first command received following the write command of a final challenge-response exchange in order for the receiver to store the value in the register.

In an alternate method for providing a value stored in a register, which may be embodied within the receiver, the receiver receives a write command from the source. The write command is directed to the register and includes write data. A first portion of the write data is designated for a password value, and a second portion of the write data is designated for a value indicative of a read request directed to the register. The receiver compares the contents of the first portion of the write data to the password value. The receiver receives a read command directed to the register. The receiver provides the value stored in the register as read data in response to the read command only if: (i) the contents of the first portion of the write data is equal to the password value, and (ii) the second portion of the write data contains the value indicative of a read request directed to the register. In addition, the read command may need to be the first command received following the write command for the receiver to provide the value stored in the register. The write data may be encoded, and the method may include decoding the encoded write data.

BRIEF DESCRIPTION OF THE DRAWINGS

Other objects and advantages of the invention will become apparent upon reading the following detailed description and upon reference to the accompanying drawings in which.

Figure 1:
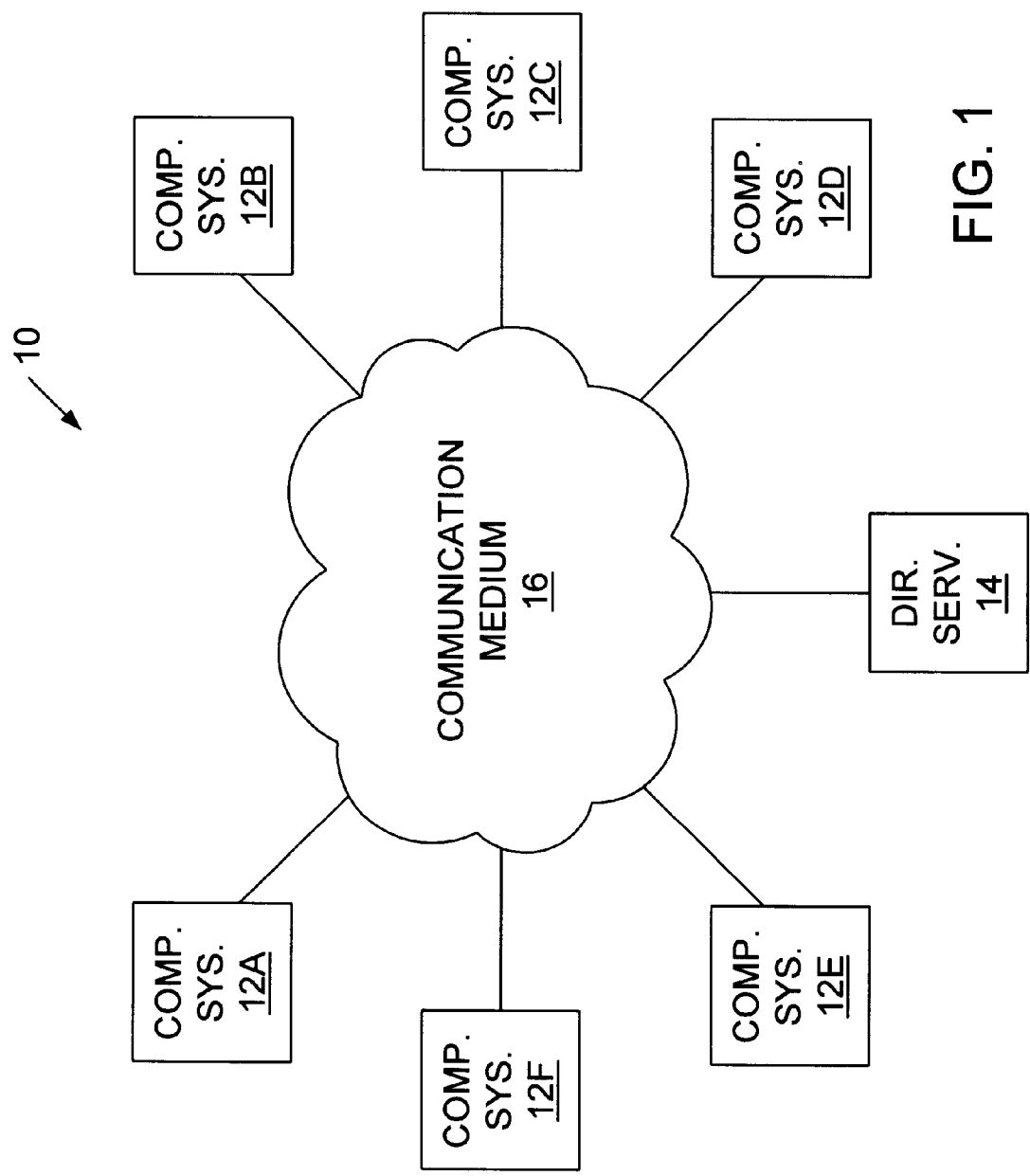
FIG. 1 is a diagram of a physical arrangement of components of one embodiment of a network for providing estimates of the current time, wherein the network includes multiple computer systems and a directory service coupled to a communication medium.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

FIG. 1 is a diagram of a physical arrangement of components of one embodiment of a network 10 for providing estimates of the current time. Network 10 includes multiple independent computer systems 12A–12F and a directory service 14 coupled to a communication medium 16. Each computer system, 12 is configured to provide estimates of the current time in response to requests presented via communication medium 16. Computer systems 12 may have different hardware architectures and/or different operating system software. Directory service 14 may be provided by a separate computer system (e.g., a directory service computer system). Computer systems 12A–12F and directory service 14 communicate with one another via communication medium 16. Communication medium 16 may, for example, include the Internet and various means for connecting to the Internet. In this case, computer systems 12A–12F and directory service 14 may each include a modem (e.g., telephone system modem, cable television modem, etc.). Alternately, communication medium 16 may be a telephone system (e.g., the plain old telephone system or POTS), and computer systems 12A–12F and directory service 14 may each include a telephone system modem. Further, computer systems 12A–12F and directory service 14 may communicate, for example, via radio waves, and communication medium 16 may be air. For reasons which will become evident below, all computer systems 12A–12F and directory service 14 need not be operational and/or coupled to communication medium 16 at the same time for network 10 to operate.

Figure 2:
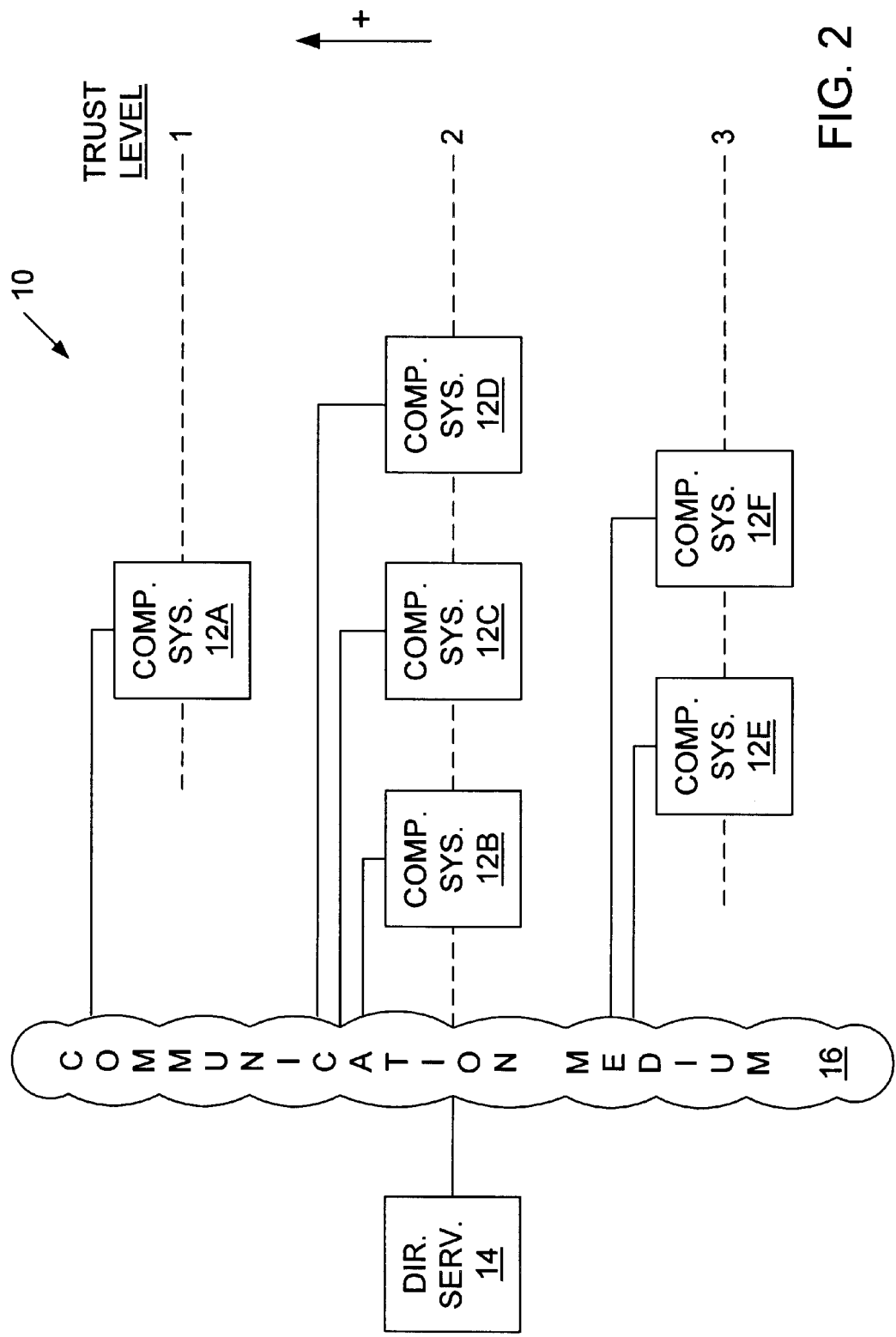
FIG. 2 is a diagram of a logical arrangement of the components of the network of FIG. 1.

FIG. 2 is a diagram of a logical arrangement of the components of network 10 of FIG. 1. In FIG. 2, computer systems 12A–12F are logically arranged to form a hierarchical structure. The hierarchical structure includes multiple levels of "trust" (i.e., trust levels) with regard to timekeeping, and the multiple trust levels are ranked with respect to one another. As will be described in detail below, the level of trust a given computer system 12 occupies depends upon: (i) a level of timekeeping dependability provided by the given computer system 12, and/or (ii) a level of timekeeping security provided by the given computer system 12. The level of timekeeping dependability of the given computer system 12 depends upon a timekeeping accuracy of a time clock of the given computer system 12, and may also depend upon a timekeeping stability and/or a timekeeping reliability of the time clock.

Computer system 12A may be a "central authority" occupying a trust level "1", the highest level of trust with regard to timekeeping in network 10. Computer systems 12B–12D may be "subordinate authorities" occupying a trust level "2", the second highest timekeeping trust level in network 10. Computer systems 12E and 12F may also be subordinate authorities occupying a trust level "3", one level of trust below trust level 2. As will be described in detail below, directory service 14 maintains information (e.g., directory information) specifying the logical arrangement of computer systems 12A–12F of network 10 as shown in FIG. 2.

FIG. 2 reflects a preferred embodiment of network 10 in which only a single computer system (computer system 12A) acts as the central authority and occupies the highest level of trust. In other embodiments of network 10, multiple computer systems 12 may occupy the highest level of trust.

Figure 3:
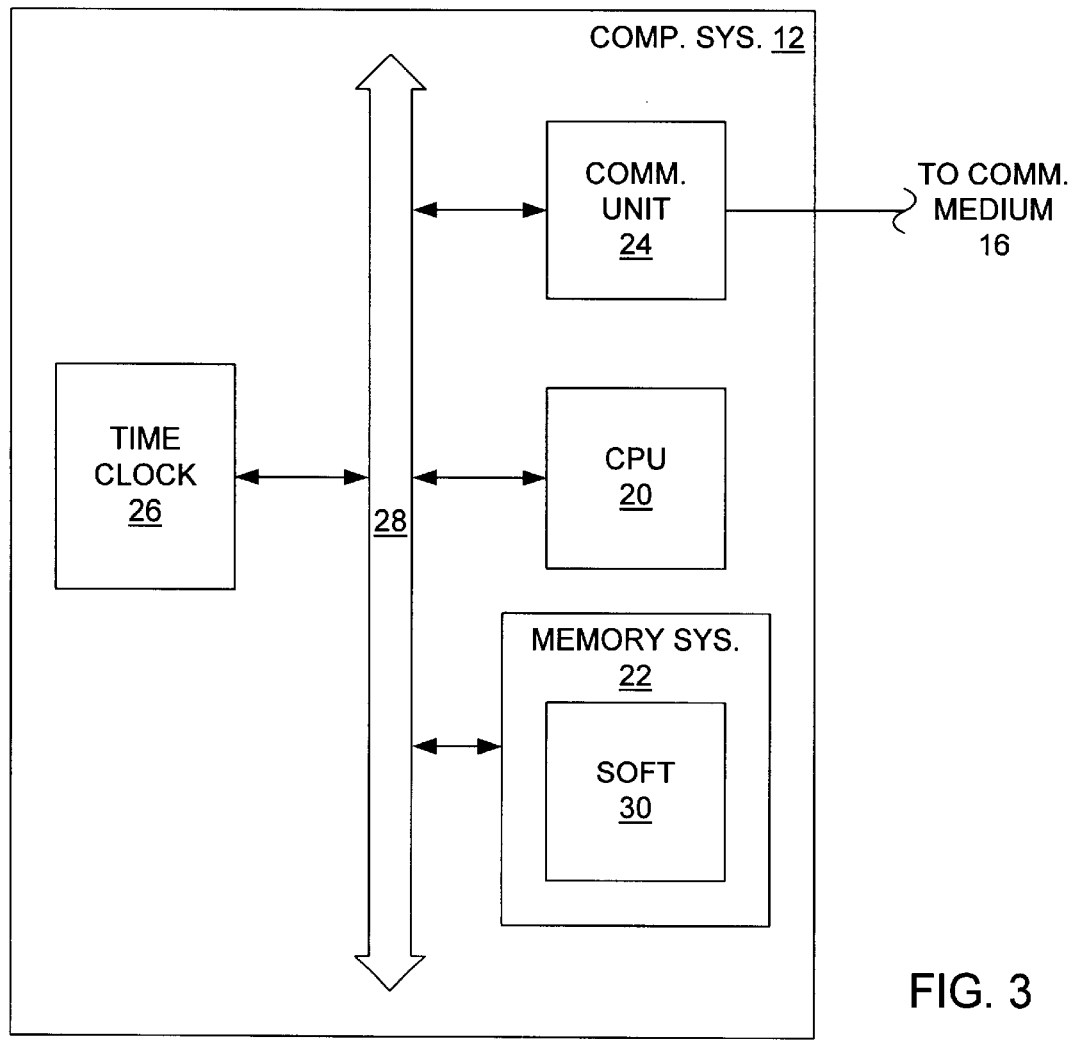
FIG. 3 is a diagram of one embodiment of a representative computer system of the network FIG. 1, and wherein the representative computer system includes a central processing unit (CPU), a memo system, a communication unit, and a time clock all coupled to a bus.

FIG. 3 is a diagram of one embodiment of a representative computer system 12 of network 10 of FIG. 1. Computer system 12 includes a central processing unit (CPU) 20, a memory system 22, a communication unit 24, and a time clock 26 coupled to a bus 28. CPU 20 executes instructions stored within memory system 22. Memory system 22 may include, for example, semiconductor read only memory (ROM), semiconductor random access memory (RAM), and/or a storage device (e.g., a hard disk drive). CPU 20, memory system 22, communication unit 24, and time clock 26 communicate with one another via bus 28.

It is noted that modern computer systems typically have multiple buses coupled to one another via bridge logic. Bus 28 may thus represent multiple buses of a modern computer system wherein the buses are coupled to one another. It is also noted that CPU 20 may include cache memory. Instructions stored within, for example, a hard disk drive of memory system 22 may be copied into the cache memory of CPU 20, and executed by CPU 20 while residing in the cache memory of CPU 20.

Time clock 26 is used to track the passage of time, and may include one or more addressable hardware registers for storing a current time value representing an estimate of the current time. Software 30 stored within memory 22 may include instructions for accessing (i.e., reading and writing) the one or more registers within time clock 26 for storing the current time value. Time clock 26 may also include one or more addressable hardware registers for storing a current date value representing, for example, the current day, month, and/or year. Software 30 may also include instructions for reading and writing the one or more registers within time clock 26 for storing the current date value. Instructions of software 30 for accessing hardware of time clock 26 may form driver software, and such driver software may be considered a part of time clock 26.

Time clock 26 has associated with it a level of timekeeping dependability. In addition to timekeeping accuracy, the level of timekeeping dependability of time clock 26 may be dependent upon timekeeping stability over time and/or timekeeping reliability. Time clock 26 may also have associated with it a level of timekeeping security. The level of timekeeping security may be dependent upon a level of tamper resistance offered by the time clock 26 and/or computer system 12 including the time clock 26. The level of trust computer system 12 occupies within network 10 thus depends upon: (i) the level of timekeeping dependability provided by time clock 26, and/or (ii) the level of timekeeping security provided by time clock 26.

Referring back to FIG. 2, computer system 12A occupies trust level 1, the highest level of trust in network 10. The level of timekeeping dependability provided by time clock 26 of computer system 12A is preferably higher than the levels of timekeeping dependability provided by time clocks 26 of computer systems 12B–12F. Accordingly, time clock 26 of computer system 12A may be a highly accurate, stable, and reliable time clock (e.g., an atomic clock with global positioning system or GPS backup). Similarly, The level of timekeeping security provided by time clock 26 of computer system 12A is preferably higher than the levels of timekeeping security provided by time clocks 26 of computer systems 12B–12F. Accordingly, time clock 26 of computer system 12A may incorporate a number of operational and physical tamper resistance measures resulting in a high degree of imperviousness to tampering.

In the preferred embodiment, a set of desirable time clock dependability attributes are established encompassing a wide range of dependable timekeeping ability. Multiple levels of timekeeping dependability (e.g., at least 4) are preferably formed by grouping of the desirable time clock dependability attributes. In general, a given time clock 26 must include a greater number of the desirable time clock dependability attributes to be assigned a higher level of timekeeping dependability. Table 1 below illustrates exemplary relationships between desirable time clock dependability attributes exhibited by a given time clock 26 and a level of timekeeping dependability assigned to the given time clock 26.

TABLE 1

Desirable Time Clock Dependability Attributes
Required For Each Level Of Timekeeping Dependability.

| Timekeeping Dependability | Desirable Time Clock Dependability Attribute Number | | | |
|---|---|---|---|---|
| Level | 1 | 2 | 3 | 4 |
| 1 | * | * | * | * |
| 2 |   | * | * | * |
| 3 |   |   | * | * |
| 4 |   |   |   | * |

In Table 1, desirable time clock dependability attribute number 1 may be, for example, that the time clock 26 has a reliability attribute characteristic of, for example, an atomic clock with GPS backup. Desirable time clock dependability attributes number 2 and 3 may be, for example, different long term stability ranges, where the long term stability range of attribute number 2 is more stringent than the long term stability range of attribute number 3. Desirable time clock dependability attribute number 4 may be an accuracy range characteristic of, for example, a real time clock (RTC) included with a typical personal computer (PC).

It is noted that Table 1 includes an equal number of desirable time clock dependability attributes and timekeeping dependability levels. In one embodiment of network 10, the timekeeping dependability level of a given computer system is dependent upon a timekeeping accuracy of the time clock of the given computer system. In this case, all of the desirable time clock dependability attributes of Table 1 are necessarily directed to timekeeping accuracy. For example, in Table 1, desirable time clock dependability attributes number 1–4 may be, for example, different accuracy ranges, where the accuracy range of attribute number 1 is more stringent than the accuracy range of attribute number 2, the accuracy range of attribute number 2 is more stringent than the accuracy range of attribute number 3, and the accuracy range of attribute number 3 is more stringent than the accuracy range of attribute number 4. For the timekeeping dependability level of a given computer system to be dependent upon timekeeping stability over time and/or timekeeping reliability in addition to timekeeping accuracy, the number of desirable time clock dependability attributes must be greater then the number of timekeeping dependability levels.

A set of desirable time clock security attributes may also be established encompassing a wide range of secure timekeeping ability. Multiple levels of timekeeping security (e.g., 2 or more) are preferably formed by grouping of the desirable time clock security attributes. In general, a given time clock 26 must include a greater number of the desirable time clock security attributes to be assigned a higher level of timekeeping security. Table 2 below illustrates exemplary relationships between desirable time clock security attributes exhibited by a given time clock 26 and a level of timekeeping security assigned to the given time clock 26.

TABLE 2

Desirable Time Clock Security Attributes Required For Each Level Of Timekeeping Security.

| Timekeeping Security Level | Desirable Time Clock Security Attribute Number | | | |
|---|---|---|---|---|
| | 1 | 2 | 3 | 4 |
| 1 | * | * | * | * |
| 2 | | * | * | * |
| 3 | | | * | * |
| 4 | | | | * |

In Table 2, desirable time clock security attribute number 1 may be, for example, that the computer system 12 executes only "trusted" software (e.g., highly tested and certified software checked for tampering before being loaded and executed). Desirable time clock security attribute number 2 may be that time clock 26 includes means for disabling the time clock if unauthorized access and/or physical tampering is detected. Desirable time clock security attribute number 3 may be that the time clock 26 includes means for detecting physical tampering (e.g., mechanical shock and/or heat sensors). Desirable time clock security attribute number 4 may be that software 30 of computer system 12 includes mechanisms for detecting and/or preventing the changing (i.e., writing) of the current time value and/or the current date value stored within time clock 26.

In one embodiment, the level of trust assigned to a given computer system 12 is dependent upon both the timekeeping dependability level and the timekeeping security level of the given computer system 12. In this case, either the timekeeping dependability level or the timekeeping security level of the given computer system 12 may be the limiting factor which determines a maximum level of trust assigned to the given computer system 12. For example, where the highest levels of trust, timekeeping dependability, and timekeeping security have the lowest values, the given computer system 12 may be assigned a trust level equal to either: (i) the timekeeping dependability level, or (ii) the timekeeping security level, whichever is greatest. In this case, computer system 12A must have both a timekeeping dependability level of 1 and a timekeeping security level of 1 in order to occupy trust level 1 (i.e., the highest trust level).

Referring to FIGS. 1 and 2, levels of trust with regard to timekeeping are distributed by computer systems 12A–12F via a delegation process. Such delegation of trust level may be performed, for example, in the process of adding a new computer system to network 10 as a time server. Alternately, assignment of a certain trust level may be required in order to use the new computer system to perform time dependent functions (e.g., air traffic control operations, time stamping of business transactions, executing evaluation software for a fixed period of time, renting/leasing software or other content such as music for a fixed period of time, etc.).

For example, a new computer system may issue a request for assignment of a level of trust to any of the computer systems 12A–12F of network 10 via communication medium 16. However, in contemplated embodiments, a given computer system 12 may only delegate or assign "subordinate" levels of trust (i.e., trust levels less than the level of trust of the given computer system 12). In this case, a computer system 12 in trust level 2 (FIG. 2) may only delegate trust levels numbered greater than or equal to 3, and may not delegate a trust level of 2 or 1. Thus a new computer system requesting a delegation of trust from a computer system 12 in a given trust level, and ultimately eligible for the same level of trust, may either be: (i) assigned a lower trust level, or (ii) referred to one or more computer systems 12 in the next higher level (e.g., via directory service 14).

The computer system 12 receiving a request for trust level assignment may initiate an authentication process during which the receiving computer system 12 verifies the identity of the new computer system, and the new computer system verifies the identity of the receiving computer system 12. After successful authentication, the receiving computer system 12 may assign the new computer system a level of trust based upon the timekeeping dependability level and/or timekeeping security level of the new computer system. During the trust level assignment process, the receiving computer system 12 and the new computer system may exchange coded messages to ensure secrecy.

For example, when the new computer system was manufactured, the manufacturer may have assigned the new computer system a timekeeping dependability level and/or timekeeping security level using the procedure described above, and may have stored the assigned timekeeping dependability level and/or timekeeping security level within the new computer system. In this case, the new computer system may provide the assigned timekeeping dependability level and/or timekeeping security level to the receiving computer system 12 in an encoded message.

Alternately, the new computer system may obtain identification information from a time clock of the new computer system (e.g., via interrogation), and may include the time clock identification information in an encoded message to the receiving computer system 12. The new computer system may also include security information of the new computer system relevant to time keeping (e.g., regarding software 30) in the encoded message. The receiving computer system 12 may then determine the timekeeping dependability level and/or timekeeping security level of the time clock using the provided identification information (e.g., by accessing a table listing time clock dependability attributes versus time clock identification information). The receiving computer 12 may then apply trust level assignment criteria in the manner described above in order to assign the new computer system a level of trust.

Further, the receiving computer system 12 may test the time clock of the new computers system by executing time clock testing software. Alternately, the receiving computer system 12 may transmit the time clock testing software to the new computer system. In this case, the new computer system may execute the time clock testing software, and convey test results produced by the time clock testing software to the receiving computer system 12 (e.g., via an encoded message). The time clock testing software may directly measure the timekeeping accuracy, stability, and/or reliability of the time clock of the new computer system. The time clock testing software may also determine the timekeeping security of the new computer system. The tests results may thus indicate the timekeeping dependability level and/or timekeeping security level of the new computer system. Alternately, the time clock testing software may determine time clock identification information identifying the time clock, and the test results may include the time clock identification information. In this case, the receiving computer system 12 may use the time clock identification information to obtain the timekeeping dependability level and/or timekeeping security level of the time clock using the provided identification information (e.g., from the table described above). The receiving computer 12 may then apply trust level assignment criteria in the manner described above in order to assign the new computer system a level of trust.

Figure 4:
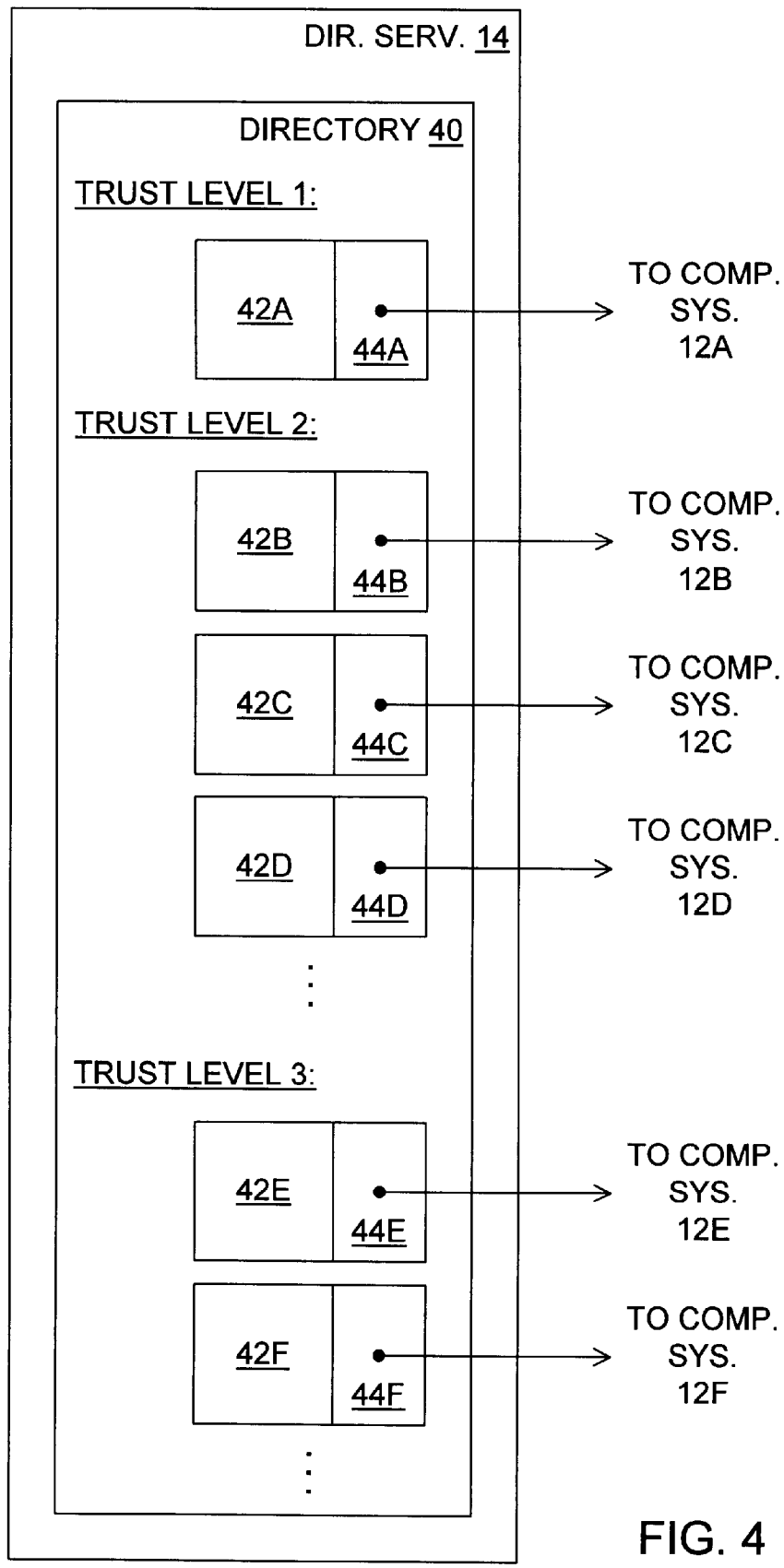
FIG. 4 is a diagram of one embodiment of the directory service of FIG. 1.

FIG. 4 is a diagram of one embodiment of directory service 14 of FIG. 1. As described above, directory service 14 may be provided by a separate computer system (e.g., a directory service computer system). It is noted that directory service 14 may also be provided by multiple computer systems, and by one or more of the computer systems 12. The computer system providing directory service 14 maintains a directory 40 which includes information specifying the logical arrangement of computer systems 12A–12F (FIG. 2). The directory service computer system also provides the information in response to requests received via communication medium 16 (FIG. 1). In FIG. 4, directory 40 includes records 42A–42F pertaining to respective computer systems 12A–12F. Directory 40 also includes links 42A–42F to respective computer systems 12A–12F. Where communication medium 16 (FIG. 1) includes the Internet, links 42A–42F may be, for example, hyperlinks to respective computer systems 12A–12F or uniform resource locators (URLs) of respective computer systems 12A–12F. Where communication medium 16 is a telephone network, links 42A–42F may be telephone numbers of respective computer systems 12A–12F.

Records 42A–42F may include the following information regarding the respective computer systems 12A–12F: the level of trust of the computer system, whether or not the computer system has trust delegation capabilities, and levels of trust the computer system is capable of delegating.

Directory service 14 may also embody, for example, a process for receiving and approving requests from new computer systems to be added to network 10, and a process for receiving and approving delegation capability updates for computer systems 12 of network 10.

Figure 5A:
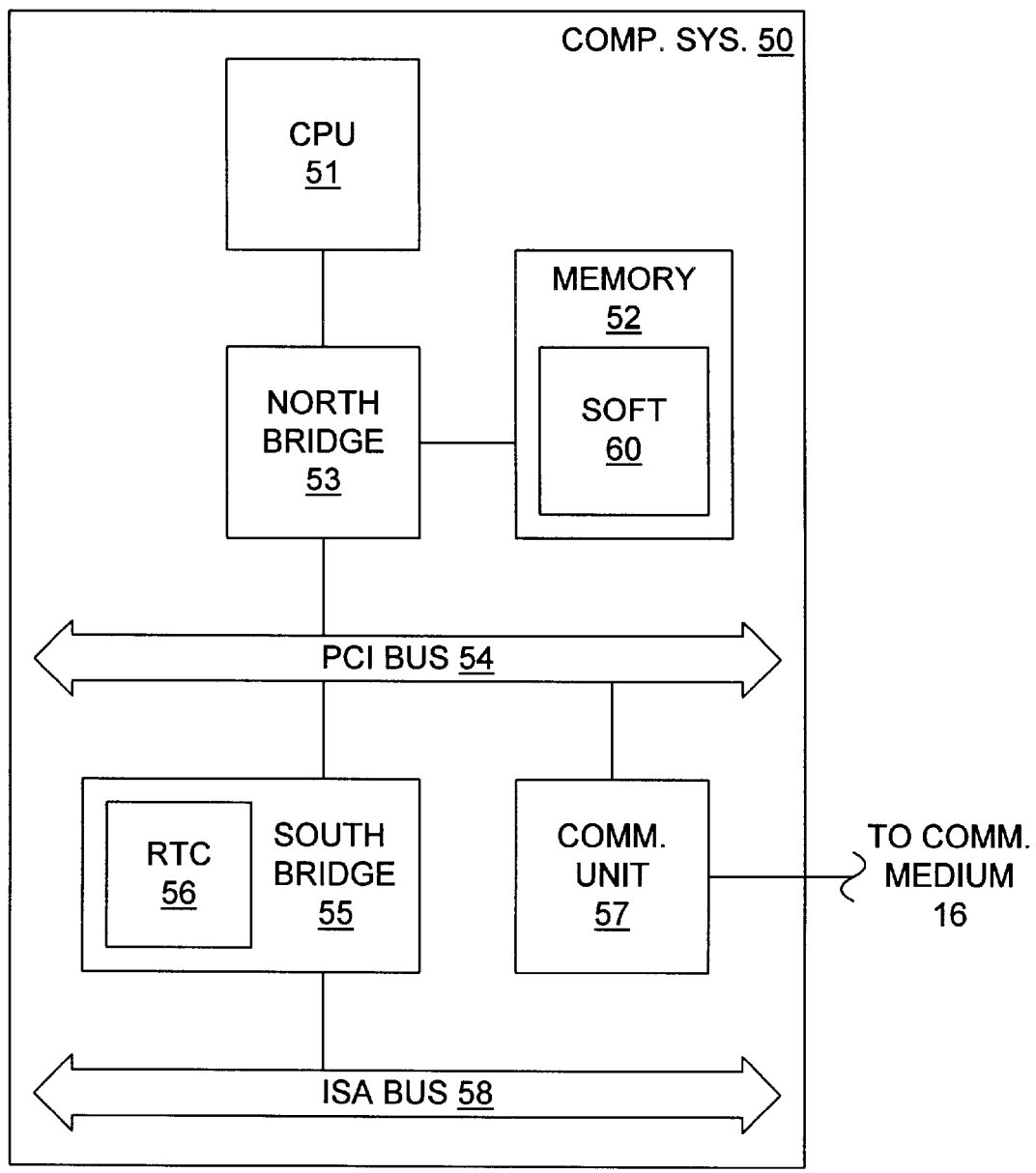
FIG. 5A is a diagram one embodiment of a computer system having a real time clock (RTC) with several highly desirable timekeeping dependability and timekeeping security attributes, and wherein the RTC includes accuracy detection logic, and wherein the computer system includes software stored within a memory, and wherein the computer system may be representative of one or more of the computer systems of the network of FIG. 1.

FIG. 5A is a diagram of one embodiment of a computer system 50 having a real time clock (RTC) 56 with several highly desirable timekeeping dependability and timekeeping security attributes. Computer system 50 may be representative of one or more of computer systems 12 of network 10 of FIG. 1. In the embodiment of FIG. 5A, computer system 50 includes a central processing unit (CPU) 51, a memory 52 including software 60, a north bridge 53, a peripheral component interconnect (PCI) bus 54, a south bridge 55 including RTC 56, a communication unit 57, and an industry standard architecture (ISA) bus 58. CPU 51 executes instructions of software 60 stored within memory 52. Memory 52 may include, for example, semiconductor read only memory (ROM) and/or semiconductor random access memory (RAM). Software 60 is preferably trusted software as described above. North bridge 53 forms an interface between CPU 51, memory 52, and PCI bus 54. South bridge 55 forms an interface between PCI bus 54 and ISA bus 58.

Figure 5B:
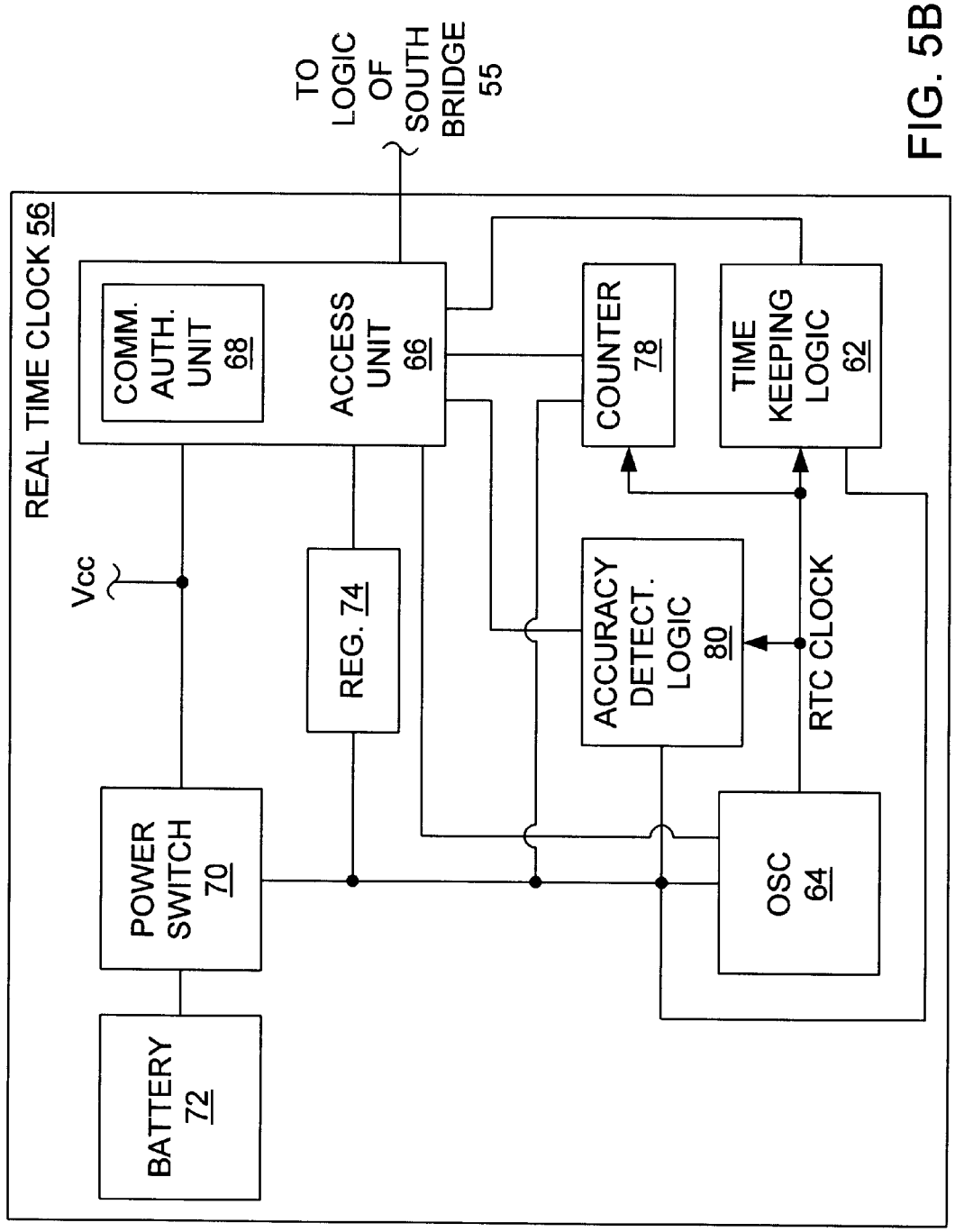
FIG. 5B is a diagram of one embodiment of the RTC of the computer system of FIG. 5A.

FIG. 5B is a diagram of one embodiment of RTC 56 of computer system 50 of FIG. 5A. RTC 56 is preferably formed upon a substrate of a single integrated circuit. RTC 56 tracks the passage of time and maintains estimates of the current time and/or the current date. RTC 56 provides a level of timekeeping dependability. In addition to the accuracy of RTC 56, the level of timekeeping dependability of RTC 56 may be dependent upon the stability of RTC 56 over time and/or the reliability of RTC 56. For example, where the level of timekeeping dependability of RTC 56 is dependent upon the accuracy, stability, and reliability of RTC 56, and where the highest levels of accuracy, stability, and reliability have the lowest values, RTC 56 may have a timekeeping dependability level equal to either: (i) the accuracy level of RTC 56, (ii) the stability level of RTC 56, or (iii) the reliability level of RTC 56, whichever is highest.

RTC 56 also provides a level of timekeeping security. The level of timekeeping security may be dependent upon a level of tamper resistance offered by the RTC 56 and/or computer system 50 including RTC 56. For example, a number of operational and physical tamper resistance measures are described below. The more of these operational and physical tamper resistance measures RTC 56 incorporates, the more impervious to tampering RTC 56 is, and the higher the level of timekeeping security RTC 56 provides.

In the embodiment of FIG. 5B, RTC 56 includes timekeeping logic 62 used to track the passage of time and to maintain estimates of the current time and/or the current date. Timekeeping logic 62 may include one or more hardware registers mapped to different addresses within an address space assigned to RTC 56 (i.e., addressable registers) for storing a current time value representing an estimate of the current time. Timekeeping logic 62 may also include one or more addressable registers for storing a current date value representing, for example, the current day, month, and/or year. Software 60 (FIG. 5A) includes RTC driver software having instructions for accessing (i.e., reading and writing) the one or more registers within timekeeping logic 62 storing the current time value and/or the current date value.

Timekeeping logic 62 operates in response to an RTC CLOCK signal produced by an oscillator 64. The RTC CLOCK signal may be, for example, a square wave signal having a substantially fixed frequency and period, and timekeeping logic 62 may track the passage of time by counting the cycles of the RTC CLOCK signal. In this case, the accuracy and stability of the estimates of the current time and/or the current date maintained by timekeeping logic 62 are dependent upon the accuracy and stability of the RTC CLOCK signal. Accordingly, the RTC CLOCK signal produced by oscillator 64 is preferably highly accurate and stable.

Oscillator 64 may include one or more registers, the contents of which determine the frequency and period of the RTC CLOCK signal. Software 60 (FIG. 5A) may include time synchronization software which periodically obtains a first estimate of the current time form an external time source (e.g., via communication unit 57), obtains a second estimate of the current time from RTC 56 (e.g., via the RTC driver software of software 60), determines a difference between the first and second estimates, calculates a value dependent upon the difference between the first and second current time estimates, and writes the value to the one or more registers within oscillator 64 (e.g., via the RTC driver software of software 60). The value is calculated such that future differences between the first and second current time estimates are reduced. In this manner, the time synchronization software provides feedback to RTC 56 which increases the accuracy and stability of the RTC CLOCK signal.

RTC 56 also includes an access unit 66 coupled to PCI bus 54 via logic of south bridge 55, and to timekeeping logic 62. The logic of south bridge 55 may provide address, control, and/or data signals driven upon PCI bus 54 (e.g., by CPU 51 of FIG. 5A) to RTC 56. The logic of south bridge 55 may also drive address, control, and/or data signals produced by access unit 66 upon corresponding signal lines of PCI bus 54.

Access unit 66 responds to address, control, and/or data signals received via PCI bus 54. In the embodiment of FIG. 5B, access unit 66 includes a communication authentication unit 68. When address and/or control signals received by access unit 66 via PCI bus 54 indicate an attempt to access a critical storage element within timekeeping logic 62 (e.g., a register storing the current time value and/or the current date value), access unit 66 may use communication authentication unit 68 to verify that the communication originated from an authorized source (e.g., the RTC driver software of software 60). Following verification that the source is an authorized source (e.g., via an authentication process), access unit 66 may "authorize" access to the critical storage element and carry out the access command.

RTC 56 also includes a power switch 70 receiving a power supply voltage Vcc (e.g., from a power supply of computer system 50) and coupled to a battery 72. During normal operation of computer system 10, utility electrical power is provided to computer system 10, and power supply voltage Vcc is available. Power switch 70 provides power supply voltage Vcc to critical timekeeping and storage elements of RTC 56 including oscillator 64 and timekeeping logic 62. Battery 72 is isolated from some of the components of RTC 56 in order to conserve electrical power stored within battery 72. When utility electrical power to computer system 10 is interrupted, power supply voltage Vcc is not available. Power switch 70 provides electrical power from battery 72 to the critical timekeeping and storage elements of RTC 56 including oscillator 64 and timekeeping logic 62. Timekeeping logic 62 is thus able to continuously maintain the estimates of the current time and/or the current date.

As described above, computer system 50 may be delegated a level of trust by a computer system 12 of network 10 (FIG. 2) dependent upon: (i) a level of timekeeping dependability provided by RTC 56, and/or (ii) a level of timekeeping security provided by RTC 56. RTC 56 also includes a register 74 for storing a "TrustQualityState" value which indicates the level of trust assigned to computer system 50 (e.g., during the above described delegation process). The "TrustQualityState" value may be conveyed to computer system 50 via an encrypted message from a computer system 12 of network 10 (FIGS. 1 and 2) during delegation of a level of trust to computer system 50.

For example, network 10 (FIG. 2) may include N trust levels, where N is an integer. In this case, the "TrustQualityState" value may include $\log_2(N)$ bits, rounded up if necessary to the next largest integer. The default "TrustQualityState" value is preferably "0", indicating that no trust level is currently assigned to computer system 50.

As noted above, RTC 56 is preferably formed upon a substrate of a single integrated circuit. As part of the integrated circuit of RTC 56, register 74 storing the "TrustQualityState" value has a high level of resistance to tampering.

In the embodiment of FIG. 5B, register 74 receives electrical power from power switch 70 such that the "TrustQualityState" value stored in register 74 is retained within register 74 when utility electrical power to computer system 10 is interrupted and power supply voltage Vcc (e.g., from a power supply of computer system 50) is not available. In this case, register 74 may include multiple volatile storage cells which require electrical power in order to store the "TrustQualityState" value. In other embodiments, register 74 may include non-volatile storage cells such as flash memory cells or electrically erasable programmable read only memory (EEPROM) cells.

Access unit 66 controls access to register 74, and the only external source allowed to modify the "TrustQualityState" value stored within register 74 may be the RTC driver software of software 60 (FIG. 5A). For example, register 74 may be mapped to an address within an address space assigned to RTC 56. In this case, register 74 is an addressable register as described above. When address and/or control signals driven upon signal lines of PCI bus 54 and received by access unit 66 indicate a write command directed to register 74, access unit 66 uses communication authentication unit 68 to verify that the RTC driver software within software 60 originated the write command. Such authentication may be accomplished via a challenge-response method described below. Following successful authentication, data signals conveyed to RTC 56 via data signal lines of PCI bus 54 and south bridge 55 may be stored within register 74, possibly modifying the "TrustQualityState" value stored within register 74.

Should the authentication be unsuccessful, the source of the write command is assumed to be unauthorized. Access unit 66 may detect and block such unauthorized attempts via PCI bus 54 to modify the "TrustQualityState" value stored within register 74. Alternately, access unit 66 may clear the "TrustQualityState" value (i.e., set the "TrustQualityState" value to "0") when an unauthorized source attempts to modify the "TrustQualityState" value stored within register 74 via PCI bus 54. After clearing the "TrustQualityState" value, access unit 66 may convey occurrence of the unauthorized attempt to access the "TrustQualityState" value to the RTC driver software of software 60 (e.g., via an interrupt).

The "TrustQualityState" value stored within register 74 is modified by logic of RTC 56 under certain circumstances. For example, register 74 may be "self-clearing" when electrical power to register 74 is interrupted and later reapplied. In other words, register 74 may include volatile storage cells as described above. The volatile storage cells may be configured to store "0", the default "TrustQualityState" value indicating that no trust level is currently assigned to computer system 50, when electrical power to register 74 is reapplied following an interruption.

As described above, access unit 66 may detect and block unauthorized attempts via PCI bus 54 to change the current time value and/or the current date value maintained by timekeeping logic 62. Alternately, access unit 66 may simply clear the "TrustQualityState" value (i.e., set the "TrustQualityState" value to "0") when the current time value and/or the current date value is modified by an unauthorized source via PCI bus. 54 (e.g., a source other than RTC driver software of software 60). After clearing the "TrustQualityState" value, access unit 66 may convey modification of the current time value and/or the current date value to the RTC driver software of software 60 (e.g., via an interrupt).

A trust level assigned to computer system 50 may expire after a certain period of time. Accordingly, in the embodiment of FIG. 5B, RTC 56 also includes a counter 78 which receives the RTC CLOCK signal described above and tracks the passage of time by counting the cycles of the RTC CLOCK signal. Access unit 66 controls access to counter 78. When the "TrustQualityState" value is conveyed to computer system 50 during delegation of a level of trust to computer system 50 as described above, a "TrustStatePersistence" value may also be conveyed to computer system 50. The "TrustStatePersistence" value may indicate a period of time after which the "TrustQualityState" value expires.

The "TrustStatePersistence" value may indicate one of several predefined periods of time. A "TrustStatePersistence" value conveyed to computer system 50 may correspond to the timekeeping dependability level and/or the timekeeping security level of computer system 50. For example, if computer system 50 has a timekeeping security level of 1 (i.e., the highest timekeeping security level), the "TrustStatePersistence" value may indicate a time period of 5 years. If computer system 50 has a timekeeping security level of 2, the "TrustStatePersistence" value may indicate a time period of, for example, 1 year. If computer system 50 has a timekeeping security level of 3, the "TrustStatePersistence" value may indicate a time period of, for example, two weeks.

When the "TrustQualityState" value stored in register 74 is modified, access unit 66 may, for example, convert a received "TrustStatePersistence" value to an equivalent number of cycles n of the RTC CLOCK signal, set counter 78 to a value which will cause counter 78 to assert an overflow signal after n+1 cycles of the RTC clock signal, and enable counter 78. In this case, enabled counter 78 may increment with each cycle of the RTC CLOCK signal. When counter 78 asserts the overflow signal, the period of time associated with the "TrustQualityState" value has expired. In response to the asserted overflow signal, access unit 66 may clear the "TrustQualityState" value stored in register 74, and disable counter 78. Access unit 66 may also convey the expiration of the period of time associated with the "TrustQualityState" value to RTC driver software of software 60 (e.g., via an interrupt).

Alternately, when the "TrustQualityState" value stored in register 74 is modified, access unit 66 may convert the received "TrustStatePersistence" value to equivalent number of cycles n of the RTC CLOCK signal enable, and set counter 78 to n. In this case, enabled counter 78 may decrement with each cycle of the RTC CLOCK signal, and assert an underflow signal one cycle of the RTC CLOCK signal after the value stored in counter 78 is "0". When counter 78 asserts the underflow signal, the period of time associated with the "TrustQualityState" value has expired. In response to the asserted underflow signal, access unit 66 may clear the "TrustQualityState" value stored in register 74, and disable counter 78. Access unit 66 may also convey the expiration of the period of time associated with the "TrustQualityState" value to the RTC driver software of software 60 (e.g., via an interrupt).

Counter 78 receives electrical power from power switch 70 such that counter 78 continues to operate when utility electrical power to computer system 10 is interrupted and power supply voltage Vcc (e.g., from a power supply of computer system 50) is not available.

Where access unit 66 is powered from power supply voltage Vcc and not from battery 72, counter 78 may include a latch which latches the asserted overflow/underflow signal to access unit 66. When power supply voltage Vcc is restored, access unit 66 may sample the overflow/underflow signal and respond appropriately.

In embodiments where access unit 66 simply clears the "TrustQualityState" value when an unauthorized source attempts to modify the "TrustQualityState" value stored within register 74, or modifies the current time value and/or the current date value maintained by timekeeping logic 62, access unit 66 may also disable counter 78.

RTC 56 also includes accuracy detection logic 80 coupled to receive the RTC CLOCK signal. Accuracy detection logic 80 includes circuitry to determine the accuracy of the frequency of the RTC CLOCK signal. For example, timekeeping logic 62 may achieve a certain level of accuracy when the frequency of the RTC CLOCK signal varies within an acceptable frequency range substantially centered about a nominal frequency. In this case, accuracy detection logic 80 may be configured to detect when the frequency of the RTC CLOCK signal is not within the acceptable frequency range, and to assert an error signal to access unit 66 when the frequency of the RTC CLOCK signal is not within the acceptable frequency range. In response to the error signal, access unit 66 may clear the "TrustQualityState" value stored in register 74, and disable counter 78. Access unit 66 may also convey the error condition to RTC driver software of software 60 (e.g., via an interrupt).

In the embodiment of FIG. 5B, accuracy detection logic 80 receives electrical power from power switch 70 such that accuracy detection logic 80 continues to operate when utility electrical power to computer system 10 is interrupted and power supply voltage Vcc (e.g., from a power supply of computer system 50) is not available.

Where access unit 66 is powered from power supply voltage Vcc and not from battery 72, accuracy detection logic 80 may include a latch which latches the asserted error signal to access unit 66. When power supply voltage Vcc is restored, access unit 66 may sample the error signal and respond appropriately.

The RTC driver software of software 60 may convey the "TrustQualityState" and "TrustStatePersistence" values to access unit 66 via an authentication/authorization process as described above. For example, in one embodiment of a challenge-response method for storing a value in a critical register of RTC 56 (e.g., register 74 storing the "TrustQualityState" value), a source (e.g., CPU 51 executing instructions of the RTC driver software of software 60) issues a read command directed to the critical register. For example, the source may drive address and control lines of PCI bus 54 with signals indicating an attempt to access the critical register.

Access unit 66 of RTC 56 receives the read command, and in response provides a challenge value as read data. Access unit 66 may use communication authorization unit 68 to generate the challenge value. For example, the challenge value may be a multiple digit number such as "1234". The source of the read command (e.g., the RTC driver software of software 60) uses the challenge value to compute a response value. At the same time, access unit 66 uses the challenge value to calculate an expected response value. Access unit 66 may use communication authorization unit 68 to generate the expected response value.

The source issues a write command via PCI bus 54 directed to the register and including write data, wherein the write data includes a response value. For example, the response to challenge value "1234" may be "14", the sum of the products of the first and second digits (1·2=2) and the third and fourth digits (3·4=12). Access unit 66 receives the write command, and compares the response value to the expected response value. If the response value is not equal to the expected response value, access unit 66 may record a challenge-response failure.

At this point, the source may initiate another challenge-response exchange by issuing another read command directed to the register and repeating the above described steps. The source and access unit 66 may be configured to carry out one or more challenge-response exchanges.

After all challenge-response exchanges are completed, the source issues a final write command via PCI bus 54 directed to the register and including write data, wherein the write data includes the value to be stored in the register. Access unit 66 receives the final write command, and stores the value in the register only if a challenge-response failure is not recorded in any of the challenge-response exchanges performed. In addition, the final write command may need to be the first command received following the write command of the last challenge-response exchange. Further, the final write command may need to be received within a predetermined time period following the write command of the last challenge-response exchange.

In an alternate authentication/authorization process, the RTC driver software may include a value known to both the RTC driver software and authentication unit 68 of access unit 66 (e.g., a password) in a designated first portion of the write data, and the "TrustQualityState" value to be stored within register 74 in a designated second portion of the write data. The RTC driver software may then encode the write data using any one of several known encoding methods. Decode of the write data by authentication unit 68 to reveal the known value (e.g., the password) in the designated first portion of the write data may provide verification to access unit 66 that the source is the RTC driver software. Upon verification that the source is the RTC driver software, access unit 66 may store the contents of the second portion of the write data, the "TrustQualityState" value, within register 74. The "TrustStatePersistence" value may be conveyed in a designated third portion of the write data, or by a separate write command carried out as described above with regard to the "TrustQualityState" value.

Figure 6:
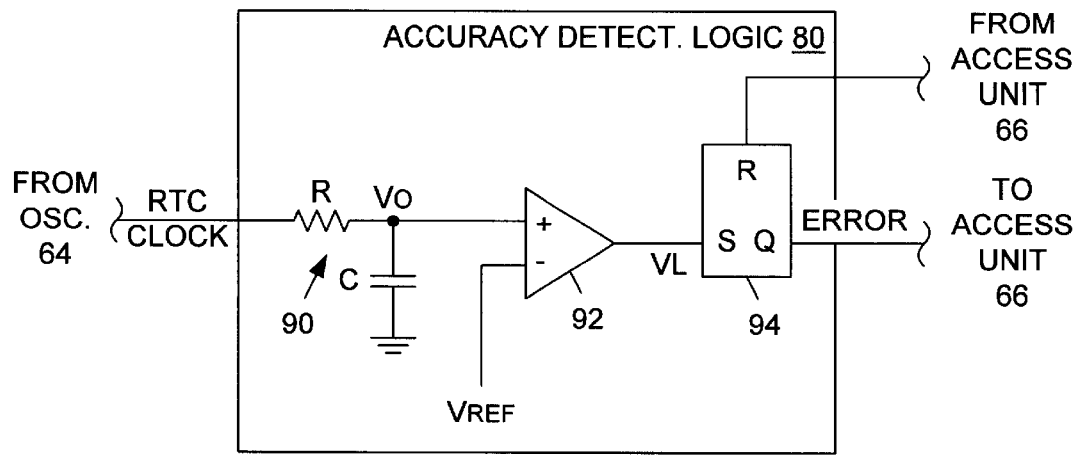
FIG. 6 is a diagram of one embodiment of the accuracy detection logic of the computer system of 5B, wherein the accuracy detection logic includes a comparator.

FIG. 6 is a diagram of one embodiment of accuracy detection logic 80 of computer system 50 of FIG. 5B. In the embodiment of FIG. 6, accuracy detection logic 80 includes a resistor-capacitor (RC) network 90, a comparator 92, and a set-reset (SR) flip-flop 94. RC network 90 receives the RTC CLOCK signal produced by oscillator 64 (FIG. 5B) and filters the RTC CLOCK signal to produce an output voltage Vo. Comparator 92 receives voltage Vo and asserts an output signal VL when the RTC CLOCK signal is below a lower limit of the acceptable frequency range described above. SR flip-flop 94 is used to latch the asserted VL signal to produce an ERROR signal. SR flip-flop 94 receives signal VL at a set (S) input and a RESET signal from access unit 66 at a reset (R) input. When in a reset state and signal VL is asserted, SR flip-flop 94 enters a set state and asserts the ERROR signal produced at a Q output. Access unit 66 is coupled to receive the ERROR signal produced by SR flip-flop 94. SR flip-flop 94 remains in the set state and continues to provide the asserted ERROR signal to access unit 66 until access unit 66 asserts the RESET signal.

Comparator 92 receives voltage Vo at a "+" input and a direct current (dc) reference voltage $V_{REF}$ at a "−" input. Reference voltage $V_{REF}$ is selected such that comparator 92 asserts the VL output signal when the frequency of the RTC CLOCK signal is less than a lower limit of the acceptable frequency range.

Figure 7:
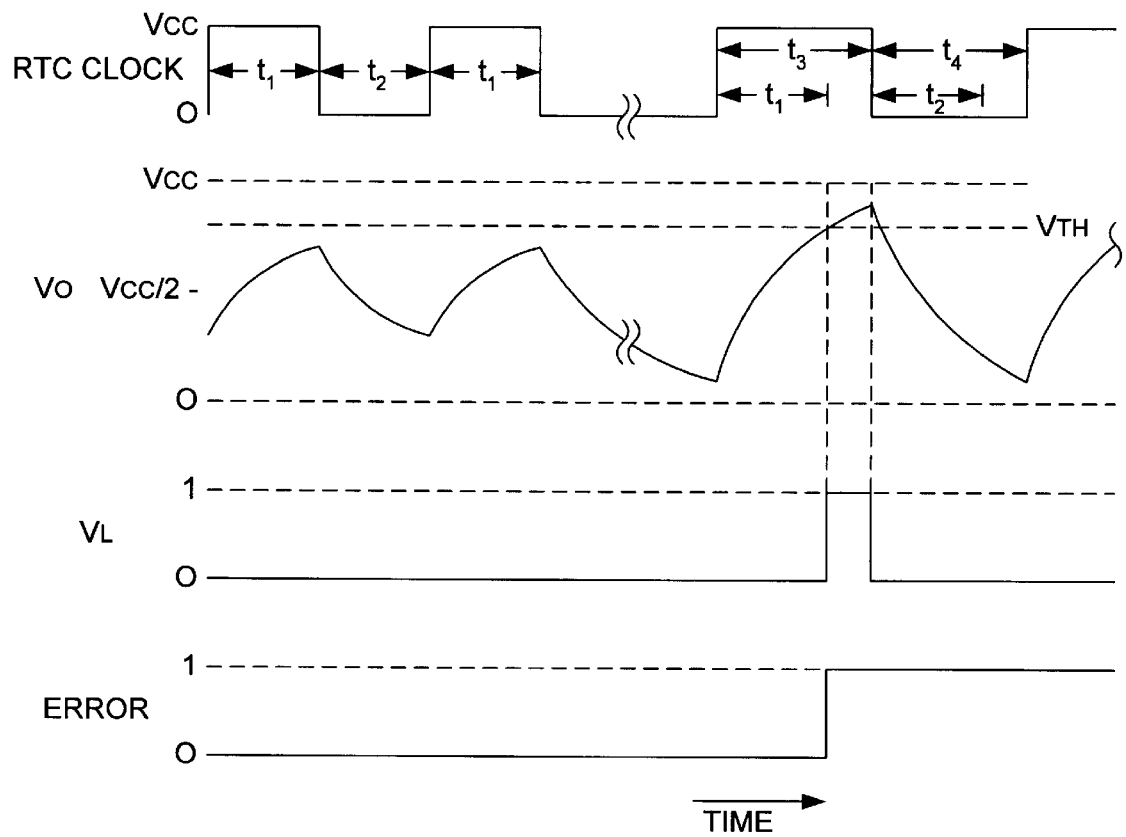
FIG. 7 is a exemplary graph of key voltages and signals of the accuracy detection logic of FIG. 6 versus time illustrating operation of the accuracy detection logic.

FIG. 7 is an exemplary graph of key voltages and signals of accuracy detection logic 80 of FIG. 6 versus time illustrating operation of accuracy detection logic 80. In a left-hand portion of FIG. 7, the RTC CLOCK signal has a magnitude of Vcc volts for time periods $t_1$, and a magnitude of 0 volts for time periods $t_2$. Time periods $t_1$ and $t_2$ are preferably substantially equal, and the RTC CLOCK signal has a frequency of $1/(t_1+t_2)$. In the left-hand portion of FIG. 7, the frequency of the RTC CLOCK signal is greater then the lower limit of the acceptable frequency range, and upward excursions of voltage Vo produced by RC network 90 (FIG. 6) do not exceed a threshold voltage $V_{TH}$, where threshold voltage $V_{TH}$ is equal to $V_{REF}$.

In a right-hand portion of FIG. 7, the RTC CLOCK signal has a magnitude of Vcc volts for time periods $t_3$, where $t_3 > t_1$ and a magnitude of 0 volts for time periods $t_4$, where $t_4 > t_2$. The RTC CLOCK signal thus has a frequency of $1/(t_3+t_4)$. In the right-hand portion of FIG. 7, the frequency of the RTC CLOCK signal is less then the lower limit of the acceptable frequency range, and upward excursions of voltage Vo produced by RC network 90 (FIG. 6) exceed threshold voltage $V_{TH}$. When voltage Vo exceeds threshold voltage $V_{TH}$, comparator 92 asserts the VL signal. When SR flip-flop 94 is in the reset state and signal VL is asserted, SR flip-flop 94 latches the asserted VL signal as described above and produces the asserted ERROR signal at the Q output until access unit 66 asserts the RESET signal.

It is noted that accuracy detection logic 80 of FIG. 6, reflecting a desired level of simplicity, asserts the ERROR signal only when the frequency of the RTC CLOCK signal is less than the lower limit of the acceptable frequency range. This is due to the fact that extending software/content usage time periods may be accomplished by reducing the frequency of the RTC CLOCK signal. It is noted that in other embodiments, accuracy detection logic 80 may also assert the ERROR signal when the frequency of the RTC CLOCK signal is greater than an upper limit of the acceptable frequency range. For example, other embodiments of accuracy detection logic 80 may include a frequency-to-voltage converter and a window comparator in order to assert the signal to the S input of SR flip-flop 94 when the frequency of the RTC CLOCK signal is: (i) less than the lower limit of the acceptable frequency range, or (ii) greater than the upper limit of the acceptable frequency range.

Figure 8:
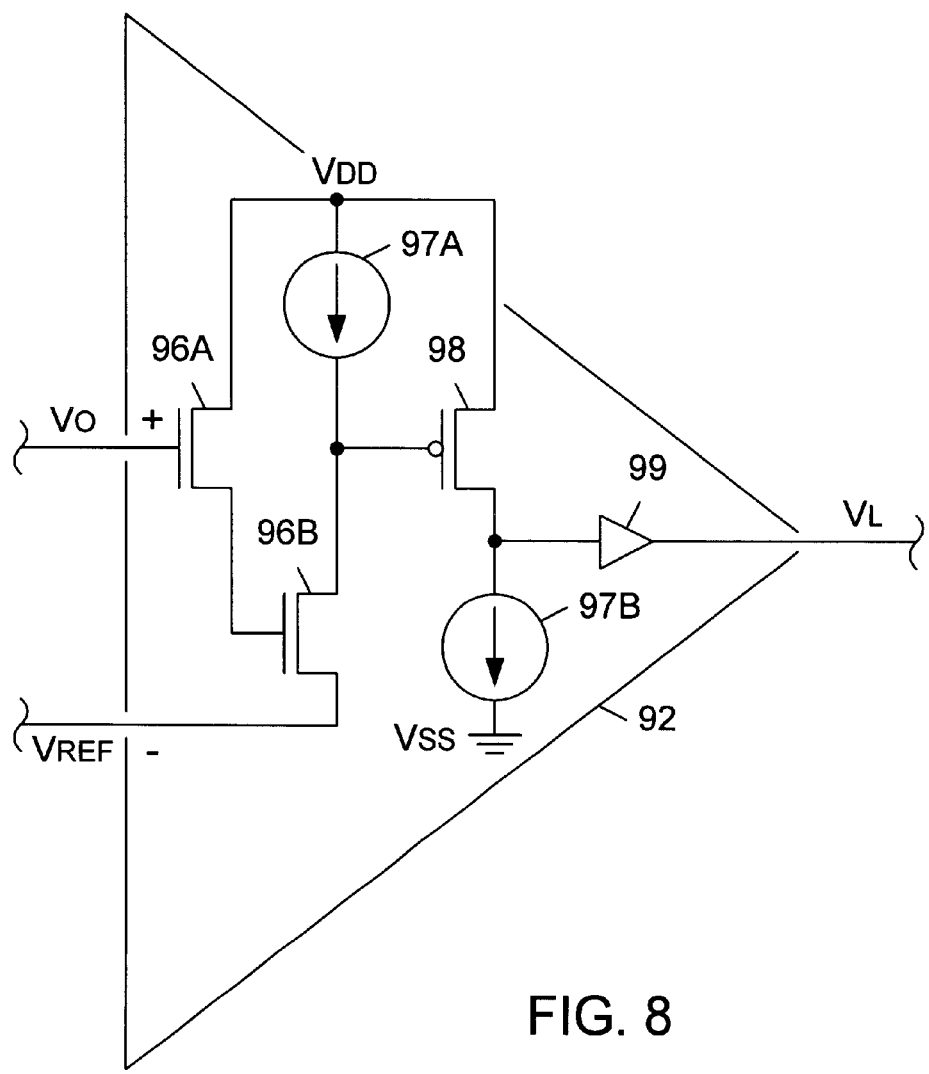
FIG. 8 is a diagram of one embodiment of the comparator of the accuracy detection logic of FIG. 6.

FIG. 8 is a diagram of one embodiment of comparator 92 of accuracy detection logic 80 of FIG. 6. In the embodiment of FIG. 8, comparator 92 includes a pair of n-channel field effect transistors (nFETs) 96A and 96B connected in voltage follower manner between power supply voltage $V_{DD}$ and reference voltage $V_{REF}$. nFET 96A has a gate electrode coupled to voltage Vo and a drain electrode coupled to power supply voltage $V_{DD}$. A gate electrode of nFET 96B is coupled to a source electrode of nFET 96A, and a source electrode of nFET 96B is coupled to voltage $V_{REF}$.

Comparator 92 also includes a current source 97A coupled between power supply voltage $V_{DD}$ a drain electrode of nFET 96B. Current source 97A may be, for example, a p-channel field effect transistor (pFET) with a gate electrode coupled to a substantially constant voltage (e.g., a reference power supply voltage $V_{ss}$) and having relatively low drive strength (i.e., a weak pullup pFET).

Comparator 92 also includes a pFET 98 having a source electrode coupled to power supply voltage $V_{DD}$ and a gate electrode coupled to the drain electrode of nFET 96B. Comparator 92 also includes a second current source 97B coupled between a drain electrode of nFET 96C and reference power supply voltage $V_{ss}$. Current source 97A may be, for example, an nFET with a gate electrode coupled to a substantially constant voltage (e.g., power supply voltage $V_{DD}$) and having relatively low drive strength (i.e., a weak pulldown nFET). Comparator 92 also includes a non-inverting buffer 99 coupled between the drain electrode of pFET 98 and an output terminal.

nFETs 96A and 96B each have a threshold voltage Vt. Thus when voltage Vo exceeds ($V_{REF}$+2·Vt), comparator 92 asserts output signal VL. Referring back to FIGS. 6 and 7, threshold voltage $V_{TH}$ (FIG. 7) is equal to ($V_{REF}$+2·Vt) where comparator 92 (FIG. 6) is the embodiment of FIG. 8.

Figure 9:
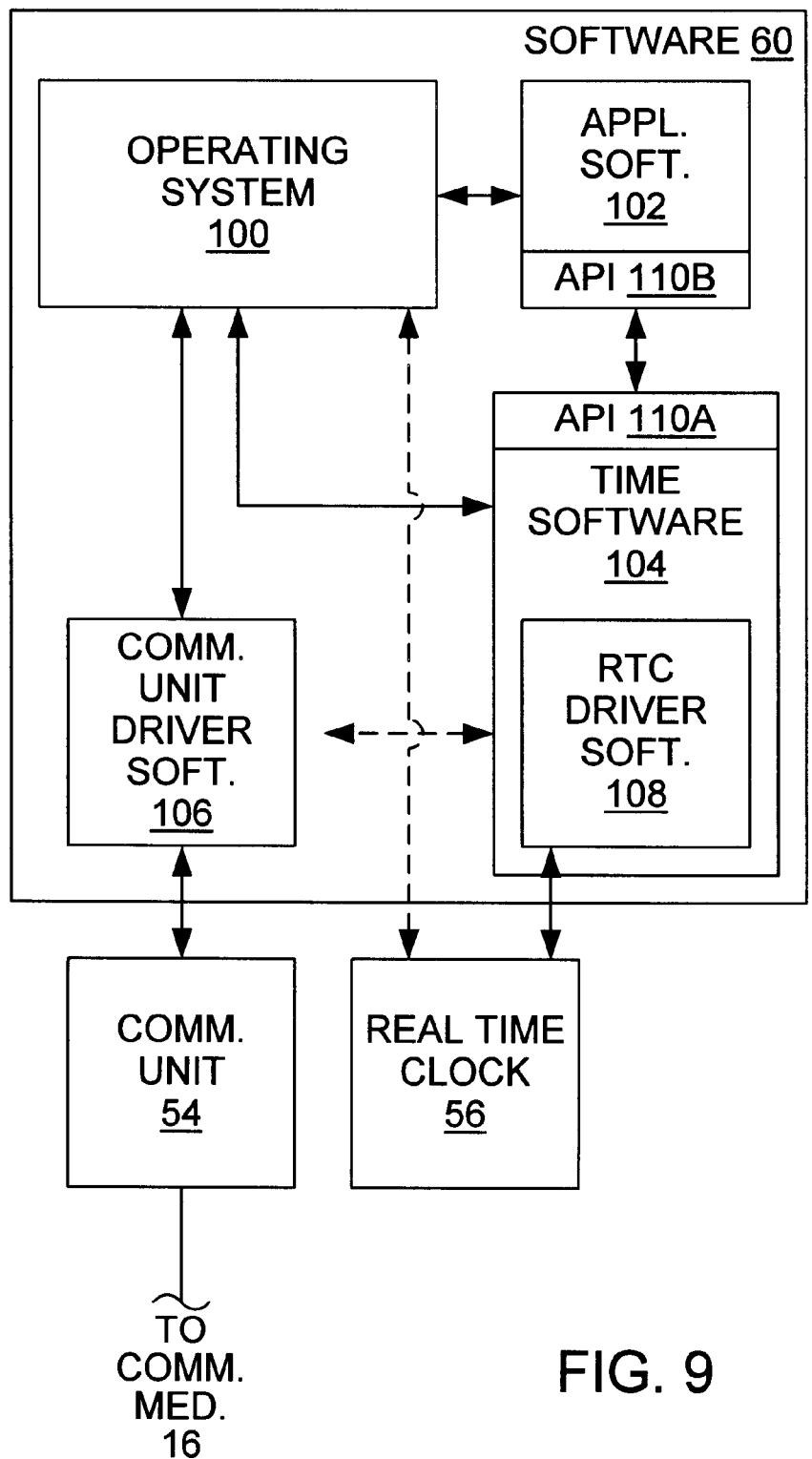
FIG. 9 is a diagram showing exemplary interrelationships between components of the software of the computer system of FIG. 5A and the RTC of FIG. 5B.

FIG. 9 is a diagram showing exemplary interrelationships between components of software 60 of FIG. 5A and RTC 56 of FIG. 5B. In FIG. 9, software 60 includes an operating system 100, an application software module 102, time software 104, and communications unit driver software 106. As indicated in FIG. 9, application software module 102 and time software 104 communicate with operating system 100 (e.g., via various application programming interfaces or APIs). Time software 104 includes RTC driver software 108 coupled to RTC 56 as described above. Time software 104 also includes an API 110A, a software interface for accessing time software 104. API 110A may include, for example, software instructions (i.e., code) forming functions and procedures for obtaining an estimate of the current time and/or the current date (e.g., from RTC 56). API 110A may also define data structures used to obtain estimates of the current time and/or the current date.

Application software module 102 may, for example, perform time critical functions such as air traffic control operations or time stamping of business transactions. Application software module 102 may also be evaluation software, or software rented or leased for a fixed period of time. Application software module 102 may also present content such as music to a user, where the content is rented or leased for a fixed period of time.

Application software module 102 includes an API 110B for obtaining estimates of the current time and/or the current date. API 110B may include, for example, software instructions which call the functions and procedures of API 110A and/or access the data structures defined by API 11A. Application software module 102 and time software 104 thus communicate via respective API 110B and API 110A as indicted in FIG. 9, and time software 104 accesses RTC 56 via RTC driver software 108.

RTC 56 may be the only real time clock within computer system 50. In this case, operating system 100 may access RTC 56 directly as indicated in FIG. 9. However, only RTC driver software 108 may be authorized to read and/or modify values stored in certain critical storage elements of RTC 56 as described above (e.g., register 74 and counter 78 of FIG. 5B). RTC 56 may thus treat attempts by operating system 100 to read and/or modify values stored in the critical storage elements as unauthorized attempts as described above. When RTC 56 is not the only real time clock within computer system 50, the direct communication path between operating system 100 and real time lock 56 indicated in FIG. 9 preferably does not exist.

API 110A of time software 104 may define a "QualityOfService" field or value as an input to a function (e.g., a subroutine or method) for obtaining estimates of the current time. The "QualityOfService" field may specify a desired trust level of the time source (e.g., the computer system) providing the estimate of the current time, and representing a "quality of service" regarding the obtaining of the estimate of the current time.

API 110A of time software 104 may also define a "CurrentTime" field or value and a "QualityofService" field or value as outputs of the function for obtaining estimates of the current time. The "CurrentTime" field may include the estimate of the current time, and the "QualityofService" field may be the "TrustQualityState" value of the time source (e.g., the computer system) from which the estimate of the current time was obtained.

In the embodiment of FIG. 9, time software 104 receives requests from application software 102 for estimates of the current time via API 110A. Each request includes a "QualityOfService" field specifying a desired trust level of the time source providing the estimate of the current time. RTC driver software 108 may, for example, convey each request to RTC 56. RTC 56 may provide the estimate of the current time to RTC driver software 108. RTC 56 may also provide the trust level of the timekeeping system of computer system 50 (e.g., the "TrustQualityState" value stored in register 74) to RTC driver software 108. Time software 104 may provide the estimate of the current time and the trust level of the timekeeping system of computer system 50 to application software 102 via API 110A. That is, "CurrentTime" field may include the estimate of the current time provided by RTC 56, and the "QualityofService" field may include the trust level of the timekeeping system of computer system 50.

If RTC 56 has a level of trust which is less than the level of trust specified in the request, application software 102 (or a user of computer system 50) may decide if the estimate of the current time provided by RTC 56 is acceptable, or if it is necessary to obtain an estimate of the current time from a remote source having a higher level of trust.

Alternately, if the request from application software 102 specifies a higher trust level than the level of trust assigned to the timekeeping system of computer system 50, time software 104 may attempt to automatically obtain the estimate of the current time from a remote source that offers the desired level of trust. As shown in FIG. 5A, computer system 50 is coupled to communication medium 16 (FIGS. 1 and 2) via communication unit 57. Time software 104 thus has access to computer systems 12 of network 10 (FIGS. 1 and 2) via communication unit 57. Communication unit 57 is accessed through communication unit driver software 106, and communication unit driver software 106 is coupled to operating system 100 (e.g., via one or more APIs). Time software 104 may thus access communication unit 57 via operating system 100 and communication unit driver software 106 as evident in FIG. 9. Alternately, time software 104 may be directly coupled to communication unit driver software 106 as indicated in FIG. 9.

When a request from application software 102 specifies a higher trust level than the level of trust assigned to computer system 50 (FIG. 5A), time software 104 may access directory service 14 of network 10 (FIGS. 1 and 2) via communication unit 57 in order to determine which computer systems 12 of network 10 have the level of trust specified in the request. Time software 104 may then contact one of the computer systems 12 of network 10 having at least the level of trust specified in the request, and obtain the estimate of the current time from the contacted time source. Time software 104 may then provide the estimate of the current time from the contacted time source to application software 102.

API 110A of time software 104, or another API of time software 104, may include functions (e.g., a subroutines or methods) for obtaining a level of trust and/or delegating levels of trust. An API for obtaining the level of trust assigned to computer system 50 may define a "Qualityof-Service" output field. In response to a request to obtain the level of trust assigned to computer system 50 (e.g., from a user via operating system 100 or from application software 102), time software 104 may request the "TrustQualityState" value stored within register 74 (FIG. 5B) from RTC 56 via RTC driver software 108.

Time software 104 may obtain the "TrustQualityState" value from RTC 56 via RTC driver software 108 using an authentication/authorization process. In a challenge-response embodiment, RTC driver software 108 and access unit 66 (FIG. 5B) of RTC 56 may participate in at least one challenge-response exchange. In each challenge-response exchange, RTC driver software 108 may issue a read command directed to an address of register 74 (FIG. 5B) used to store the "TrustQualityState" value. Access unit 66 may receive the read command, produce a challenge value, and provide the challenge value as read data in response to the read command. Communication authentication unit 68 (FIG. 5B) of access unit 66 may produce the challenge value. Each challenge value produced by access unit 66 is preferably unique, and may be produced by a random number generator.

RTC driver software 108 uses the received challenge value to calculate a response value. At the same time, access unit 66 uses the challenge value to calculate an expected response value. For example, RTC driver software 108 may apply a method, embodied within RTC driver software 108, to the challenge value in order to produce the response value. The same method is also embodied within access unit 66 (e.g., within communication authentication unit 68), and access unit 66 applies the method to the challenge value in order to produce the expected response value.

Once RTC driver software 108 has calculated the response value, RTC driver software 108 may issue a write command directed to register 74 (FIG. 5B) and including the response value as write data. Access unit 66 receives the write data, and compares the response value to the expected response value. If the response value is not equal to the expected response value, access unit 66 may record a challenge-response failure (e.g., by latching a failure signal). At this point, RTC driver software 108 may issue another read command initiating another challenge-response exchange. The number of challenge-response exchanges may be, for example, agreed between upon between access unit 66 and RTC driver software 108 in advance.

After the final challenge-response exchange, RTC driver software 108 issues a final read command directed to the address of register 74. Access unit responds to the read command by providing the "TrustQualityState" value stored in register 74 only if: (i) a challenge-response failure is not recorded in any challenge-response exchange, and (ii) the final read command is the first command received following the write command of a final challenge-response exchange.

In an alternate authentication/authorization process, RTC driver software 108 obtains the "TrustQualityState" value from RTC 56 by issuing an "unlock" write command immediately before issuing a read command directed to register 74. RTC driver software 108 includes a password in a designated first portion of the unlock write data, and a value conveying a read request directed to register 74 in a designated second portion of the write data. RTC driver software 108 may then encode the unlock write data using any one of several known encoding methods. Decode of the unlock write data by authentication unit 68 to reveal the password in the first portion of the unlock write data may provide verification to access unit 66 that the source is RTC driver software 108.

During normal operation, access unit 66 is in a locked mode with respect to the contents of register 74 storing the "TrustQualityState" value. Upon verification that the source of the unlock write command is RTC driver software 108, access unit 66 may respond to the second portion of the write data conveying the read request directed to register 74 by entering an unlocked mode with respect to the contents of register 74. The next command received by access unit 66 following the unlock write command must be the read command directed to register 74. Further, the read command may need to be received within a predetermined period of time following the unlock write command. In response to the read command directed to register 74, access unit 66 may provide the "TrustQualityState" value stored in register 74. Following the read command, access unit 66 may reenter the locked mode with respect to the contents of register 74.

Upon receiving the "TrustQualityState" value obtained from RTC 56, time software 104 may provide the "TrustQualityState" value to the requester as the "QualityofService" output via the API for obtaining the level of trust assigned to computer system 50.

An API for obtaining a level of trust from a remote source may define a "QualityofService" input field or value which specifies a desired level of trust to be delegated to computer system 50. The API may also define a "QualityofService" output field or value. The "QualityofService" output field may be the "TrustQualityState" value provided by a remote source as a result of a request to obtain a level of trust from a remote source.

As described above, levels of trust with regard to timekeeping are distributed by computer systems 12 of network 10 (FIGS. 1 and 2) via a delegation process. Such delegation of trust level may be used to convey to computer system 50 (FIG. 5A) the "TrustQualityState" value stored within register 74 (FIG. 5B). Delegation of trust level may be performed, for example, in the process of adding computer system 50 to network 10 as a time server. Alternately, computer system 50 may require a certain trust level in order to use computer system 50 to perform time critical functions (e.g., air traffic control operations, time stamping of business transactions, executing evaluation software or content rented or leased for a fixed period of time, etc.).

In response to a request (e.g., from the user via operating system 100 or from application software 102), time software 104 may issue a request for assignment of a level of trust to one of the computer systems 12 of network 10 (FIGS. 1 and 2) via communication unit 57. As described above, the computer system 12 receiving the request may initiate an authentication process during which the receiving computer system 12 verifies the identity of the trusted time subsystem within computer system 50, and computer system 50 verifies the identity of the trusted time subsystem within the receiving computer system 12.

Following successful authentication, the receiving computer system and computer system 50 may communicate via encoded messages. Computer system 50 may transmit the timekeeping dependability level and/or the timekeeping security level of RTC 56 to the receiving computer 12. Alternately, computer system 50 may transmit information identifying RTC 56 (e.g., manufacturing make and model information) as described above, and the receiving computer system 12 may determine the timekeeping dependability level and/or the timekeeping security level of RTC 56 using the information. The receiving computer system 12 may then assign and convey "TrustQualityState" and "TrustStatePersistence" values to time software 104 of computer system 50 based upon the timekeeping dependability level and/or timekeeping security level of RTC 56.

Upon receiving the "TrustQualityState" and "TrustStatePersistence" values, time software 104 may provide the "TrustQualityState" and "TrustStatePersistence" values to RTC 56 via RTC driver software 108. Time software 104 may also provide the "TrustQualityState" value obtained from the remote source as the "QualityofService" output to the requestor (e.g., to the user via operating system 100 or to application software 102) via the API.

It is noted that in other embodiments time software 104, RTC driver software 108, and/or communications unit driver software 106 may be part of operating system 100.

Figure 10:
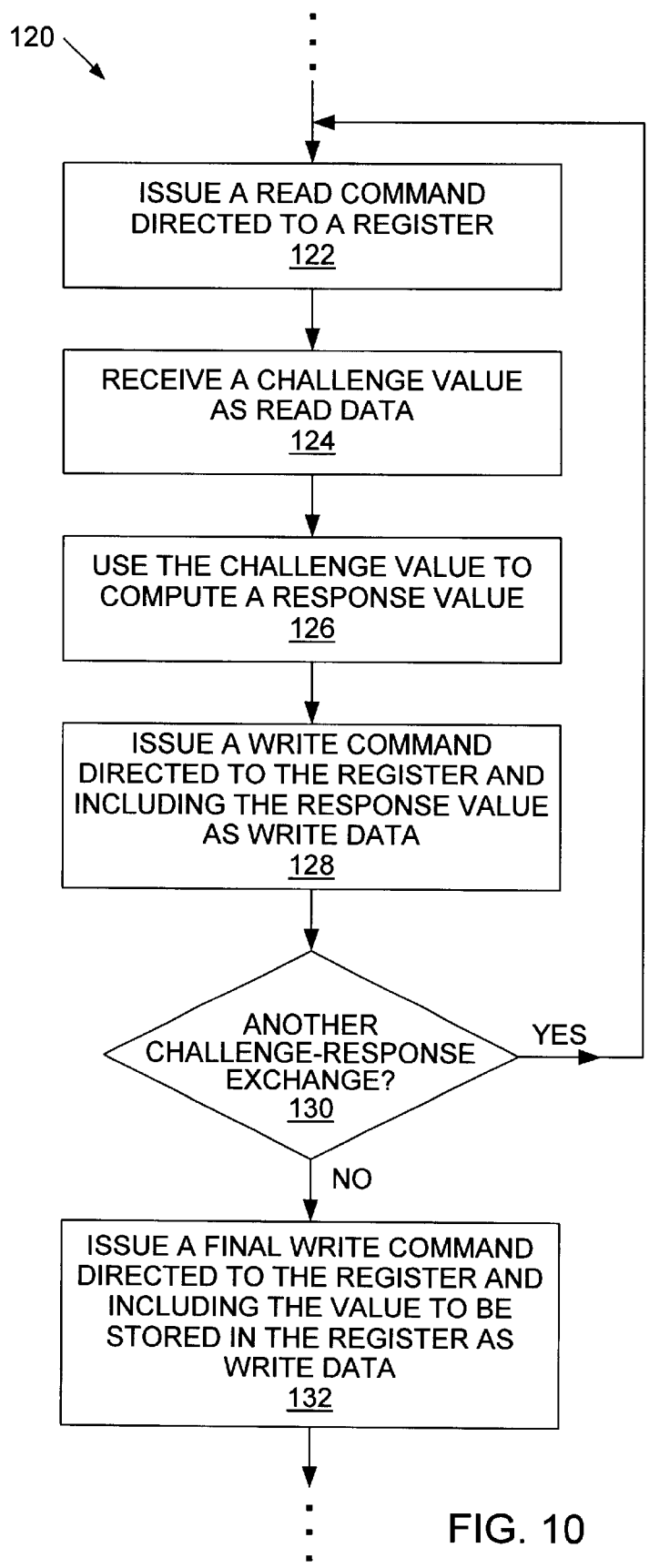
FIG. 10 is a flow chart of a one embodiment of a challenge-response method for storing a value in a register which may be embodied within a source.
Figure 11A:
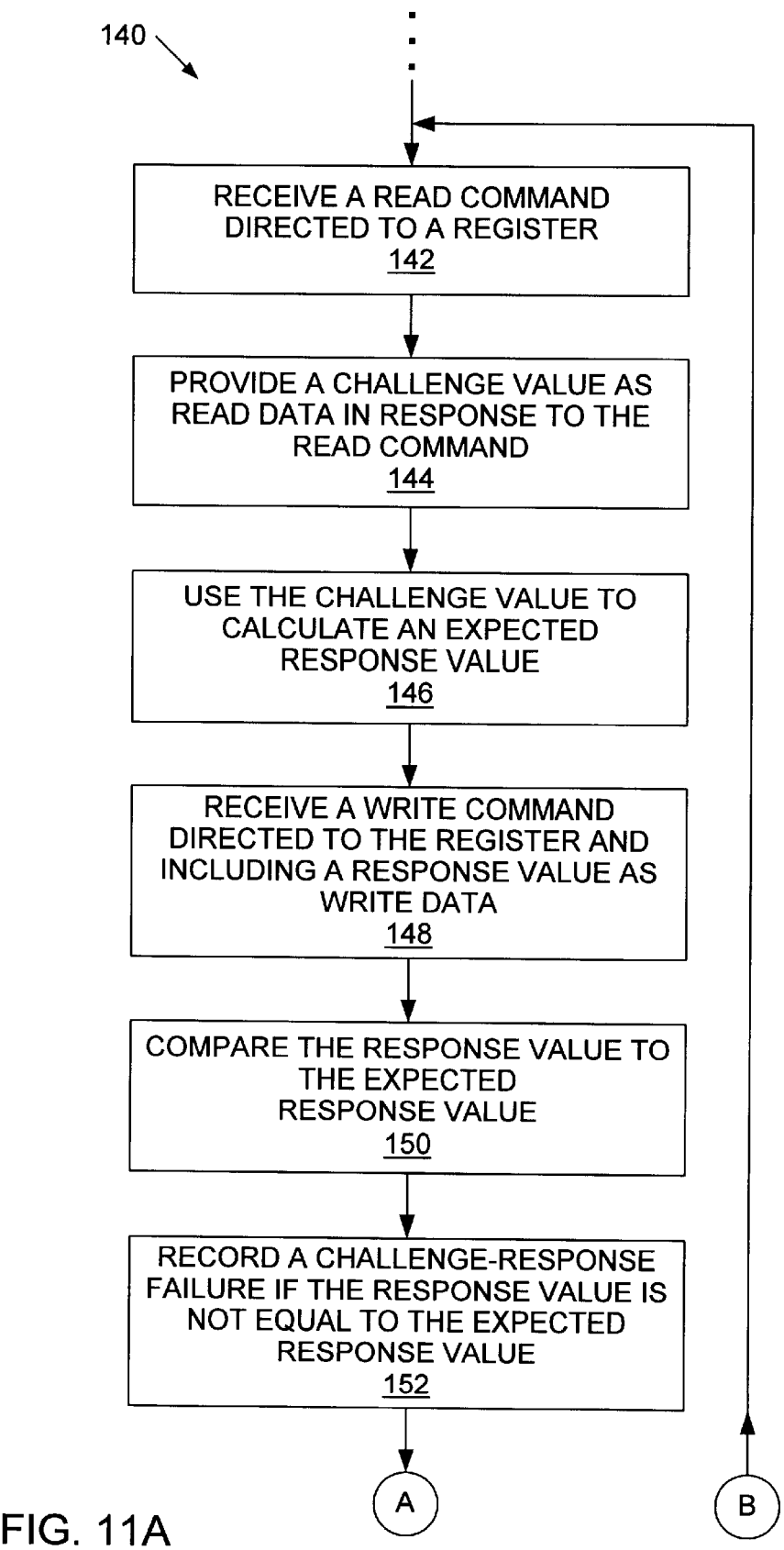
FIGS. 11A and 11B form a flow chart of a one embodiment of a challenge-response method for storing a value in a register which may be embodied within a receiver controlling access to the register.
Figure 11B:
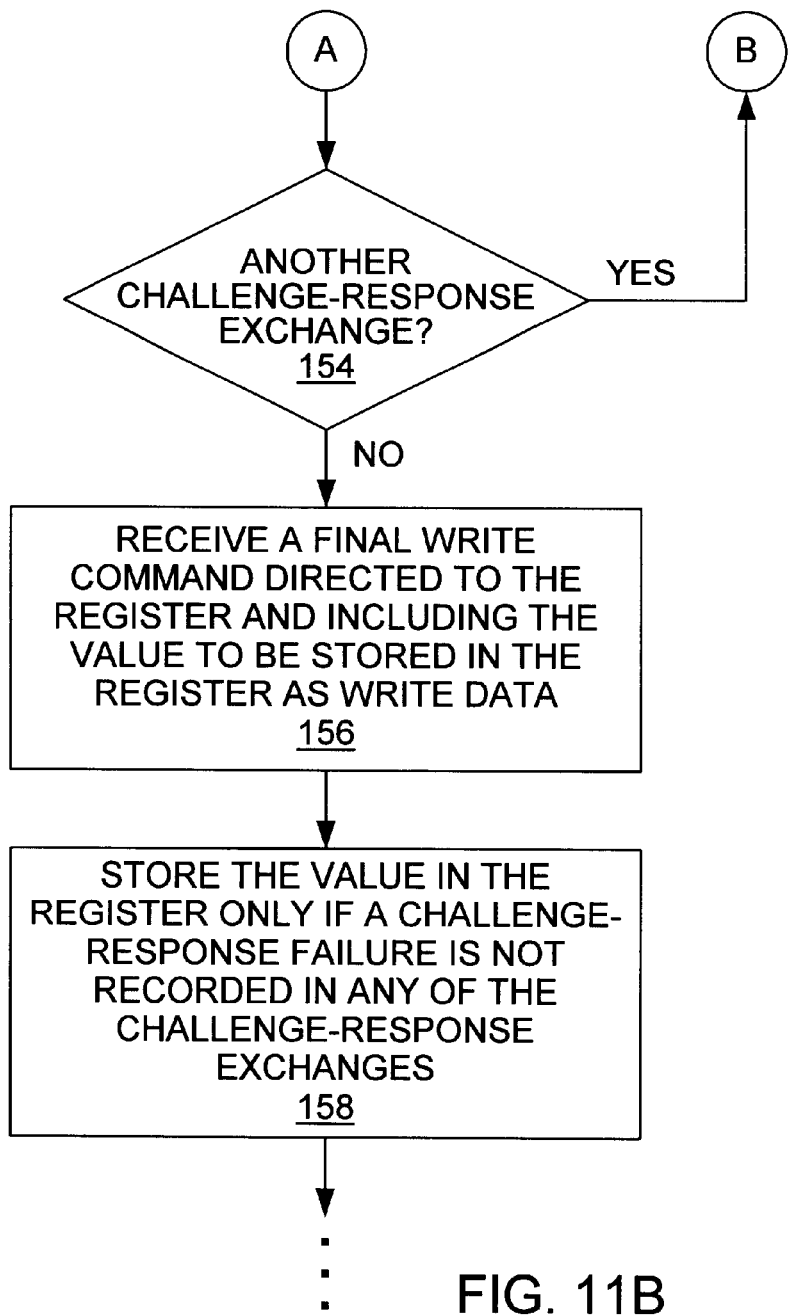

FIG. 10 is a flow chart of a one embodiment of a challenge-response method 120 for storing a value in a register which may be embodied within a source. FIGS. 11A and 11B form a flow chart of a one embodiment of a challenge-response method 140 for storing a value in a register which may be embodied within a receiver controlling access to the register. Method 120 may be embodied within the RTC driver software of software 60 (FIG. 5A), and method 140 may be embodied within access unit 66 of RTC 56 (FIG. 5B). In this case, CPU 51 (FIG. 5A), executing instructions of the RTC driver software of software 60, performs the steps of method 120 while access unit 66 simultaneously performs the steps of method 140.

CPU 51 issues a read command directed to a register (e.g., register 74 of FIG. 5B) during a step 122. Access unit 66 of RTC 56 receives the read command during a step 142, and in response provides a challenge value as read data during a step 144. As described above, access unit 66 may use communication authorization unit 68 (FIG. 5B) to generate the challenge value.

CPU 51 receives the challenge as read data during a step 124, and uses the challenge value to compute a response value during a step 126. At the same time, access unit 66 uses the challenge value to calculate an expected response value during a step 146. As described above, access unit 66 may use communication authorization unit 68 to generate the expected response value.

CPU 51 issues a write command directed to the register and including the response value as write data during a step 128. Access unit 66 receives the write command during a step 148, and compares the response value to the expected response value during a step 150. If the response value is not equal to the expected response value, access unit 66 records a challenge-response failure during a step 152.

The RTC driver software of software 60 and access unit 66 may be configured to carry out more than one challenge-response exchange. In this case, execution of decision steps 130 and 154 cause the above steps are repeated.

When no more challenge-response exchanges are to be carried out in decision steps 130 and 154, CPU 51 issues a final write command directed to the register and including the value to be stored in the register as write data during a step 132. Access unit 66 receives the final write command during a step 156, and stores the value in the register during a step 158 only if a challenge-response failure is not recorded in any of the challenge-response exchanges performed.

As described above, the final write command may need to be the first command received following the write command of the last challenge-response exchange in order for the receiver to store the value in the register during step 158. Further, the final write command may need to be received within a predetermined time period following the write command of the last challenge-response exchange.

It is noted that a challenge-response method similar to method 120 and for obtaining a value stored in a register exists for the source and is described above. A corresponding method similar to method 140 and for providing a value stored in a register exists for the receiver and is also described above.

Figure 12:
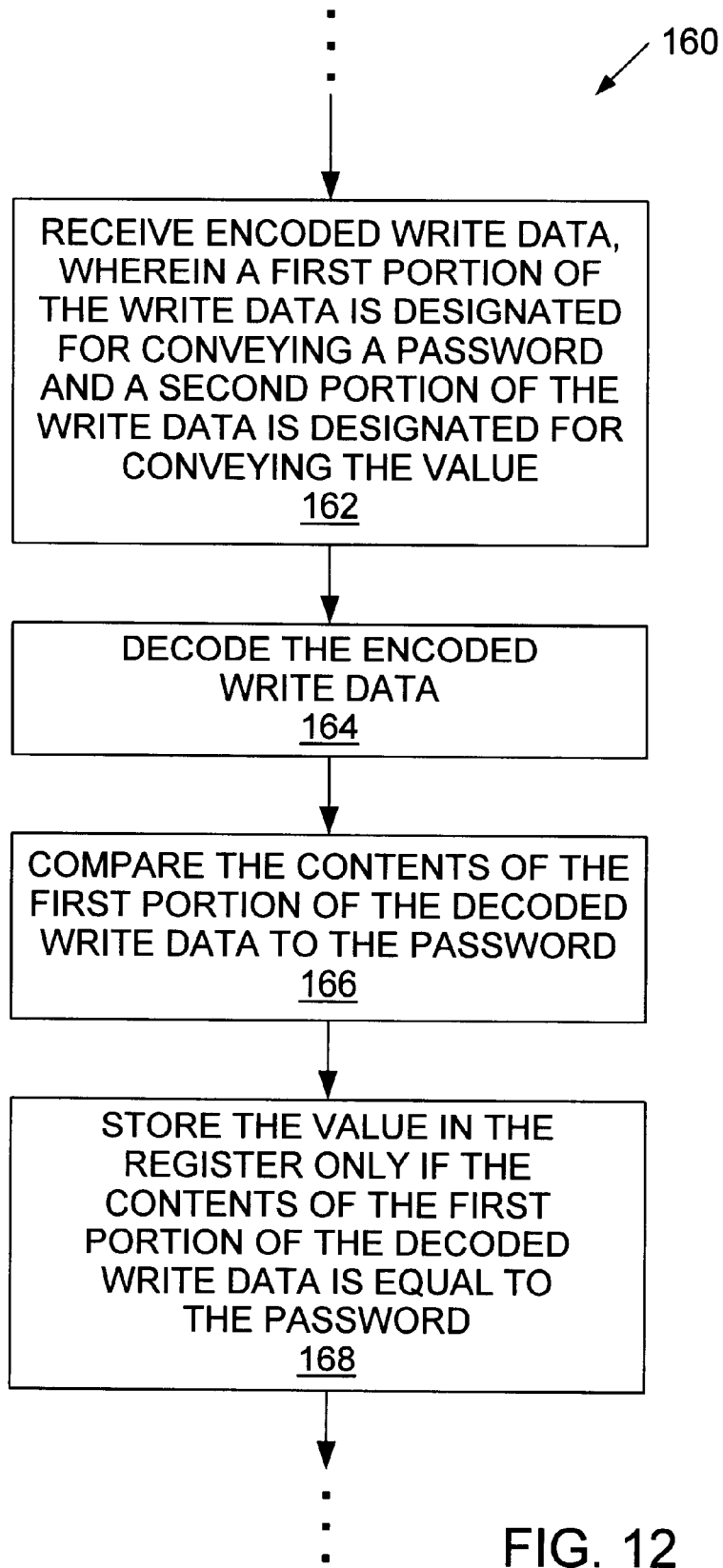
FIG. 12 is a flow chart of one embodiment of an alternate method for storing a value in register which may be embodied within the receiver.

FIG. 12 is a flow chart of one embodiment of an alternate method 160 for storing a value in a register which may be embodied within the receiver. A corresponding method for the source is evident from the following description of method 160. In method 160, the source (e.g., CPU 51 executing instructions of the RTC driver software of software 60) generates write data having: (i) a value known to both the source and the receiver (e.g., a password) in a designated first portion of the write data, and (ii) the value to be stored within the register in a designated second portion of the write data. The source then encodes the write data using any one of several known encoding methods, and issues a write command directed to the register and including the encoded write data.

Method 160 may be embodied within access unit 66 of RTC 66. In this case, access unit 66 receives the encoded write data during a step 162, and decodes the encoded write data during a step 164. Access unit 166 compares the contents of the first portion of the decoded write data to the password during a step 166, and stores the contents of the second portion of the decoded write data (i.e., the value) in the register during a step 168 only if the contents of the first portion of the decoded write data is equal to the password.

It is noted that in other embodiments of method 160, the write data may not be encoded. It is also noted that a method similar to method 160 and for providing a value stored in a register exists for the receiver and is described above. A corresponding method for obtaining a value stored in a register exists for the source is also described above.

Numerous variations and modifications will become apparent to those skilled in the art once the above disclosure is fully appreciated. It is intended that the following claims be interpreted to embrace all such variations and modifications.

What is claimed is:

1. A real time clock, comprising:

a register configured to store a value, wherein the value is dependent upon a timekeeping accuracy of the real time clock, wherein the value expires a predetermined period of time after issue; and an access unit coupled to the register and adapted for coupling to a bus, wherein the access unit is configured to control access to the register, and wherein the access unit is configured to store a default value of "0" in the register when the predetermined period of time has elapsed.

2. The real time clock as recited in claim 1, wherein the value is also dependent upon a timekeeping stability of the real time clock.

3. The real time clock as recited in claim 1, wherein the value is also dependent upon a timekeeping reliability of the real time clock.

4. The real time clock as recited in claim 1, wherein the value is also dependent upon a timekeeping security of the real time clock, and wherein the timekeeping security is dependent upon a tamper resistance of the real time clock.

5. The real time clock as recited in claim 1, wherein the access unit is configured to receive the value as write data from a source via the bus, to determine if the source is authorized to modify the value, and to store the value in the register only if the source is authorized to modify the value.

6. The real time clock as recited in claim 1, wherein the register comprises a plurality of volatile storage cells requiring electrical power to store the value.

7. The real time clock as recited in claim 6, wherein the real time clock comprises a battery, and wherein the register receives electrical power from: (i) a source external to the real time clock, and (ii) the battery when electrical power is not available from the external source.

8. The real time clock as recited in claim 1, wherein the register comprises a plurality of non-volatile storage cells which do not require electrical power to store the value.

9. A real time clock, comprising:

a register configured to store a value, wherein the value is dependent upon a timekeeping accuracy of the real time clock, and wherein the value expires after a predetermined period of time after issue;

a counter configurable to issue a signal after the predetermined period of time;

an access unit coupled to the register and adapted for coupling to a bus, wherein the access unit is configured to:

receive the value via the bus and store the value in the resister;

configure the counter to issue the signal after the predetermined period of time; and store a default value of "0" in the register when the signal is received from the counter.

10. The real time clock as recited in claim 9, wherein the value is also dependent upon a timekeeping stability of the real time clock.

11. The real time clock as recited in claim 9, wherein the value is also dependent upon a timekeeping reliability of the real time clock.

12. The real time clock as recited in claim 9, wherein the value is also dependent upon a timekeeping security of the real time clock, and wherein the timekeeping security is dependent upon a tamper resistance of the real time clock.

13. The real time clock as recited in claim 9, wherein the access unit is configured to receive the value as write data from a source via the bus, to determine if the source is authorized to modify the value, and to store the value in the register only if the source is authorized to modify the value.

14. The real time clock as recited in claim 9, wherein the counter requires electrical power for operation.

15. The real time clock as recited in claim 14, wherein the real time clock comprises a battery, and wherein the counter receives electrical power from: (i) a source external to the real time clock, and (ii) the battery when electrical power is not available from the external source.

16. A real time clock, comprising:

timekeeping logic coupled to receive a clock signal and configured to maintain an estimate of the current time dependent upon a frequency of the clock signal;

accuracy detection logic coupled to receive the clock signal and configured to issue an error signal if the frequency of the clock signal deviates from an acceptable frequency range;

a register configured to store a value, wherein the value is dependent upon a timekeeping accuracy of the real time clock, and wherein the value expires after a predetermined period of time after issue;

a counter configurable to issue an expiration signal after the predetermined period of time;

an access unit coupled to the register and adapted for coupling to a bus, wherein the access unit is configured to:

receive the value via the bus and store the value in the resister;

configure the counter to issue the signal after the predetermined period of time; and store a default value of "0" in the register when: (i) the error signal is received from the accuracy detection logic, or (ii) the expiration signal is received from the counter.

17. The real time clock as recited in claim 16, wherein the value is also dependent upon a timekeeping stability of the real time clock.

18. The real time clock as recited in claim 16, wherein the value is also dependent upon a timekeeping reliability of the real time clock.

19. The real time clock as recited in claim 16, wherein the value is also dependent upon a timekeeping security of the real time clock, and wherein the timekeeping security is dependent upon a tamper resistance of the real time clock.

20. The real time clock as recited in claim 16, wherein the access unit is configured to receive the value as write data from a source via the bus, to determine if the source is authorized to modify the value, and to store the value in the register only if the source is authorized to modify the value.

* * * * *